(12) United States Patent
Takano

(10) Patent No.: US 11,387,874 B2
(45) Date of Patent: Jul. 12, 2022

(54) COMMUNICATION DEVICE, COMMUNICATION CONTROL METHOD AND RECORDING MEDIUM

(71) Applicant: Sony Corporation, Tokyo (JP)

(72) Inventor: Hiroaki Takano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/260,579

(22) PCT Filed: Jul. 24, 2019

(86) PCT No.: PCT/JP2019/029105
§ 371 (c)(1),
(2) Date: Jan. 15, 2021

(87) PCT Pub. No.: WO2020/031704
PCT Pub. Date: Feb. 13, 2020

(65) Prior Publication Data
US 2021/0281301 A1    Sep. 9, 2021

(30) Foreign Application Priority Data
Aug. 9, 2018   (JP) .............................. JP2018-150415

(51) Int. Cl.
*H04B 7/02*    (2018.01)
*H04L 1/02*    (2006.01)
*H04B 7/06*    (2006.01)

(52) U.S. Cl.
CPC ................................. *H04B 7/0602* (2013.01)

(58) Field of Classification Search
CPC .. H04B 7/0602; H04B 7/0691; H04B 7/0695; H04W 8/24; H04W 72/04; H04W 88/02
(Continued)

(56) References Cited

U.S. PATENT DOCUMENTS 6,236,866 B1 *  5/2001  Meyer ................... H01Q 1/246
                                                        370/342
9,787,103 B1 * 10/2017  Leabman .............. H04W 12/06
(Continued)

FOREIGN PATENT DOCUMENTS

JP    2006-279815 A    10/2006
JP    2008-199424 A     8/2008
(Continued)

OTHER PUBLICATIONS

International Search Report and Written Opinion dated Oct. 15, 2019, received for PCT Application No. PCT/JP2019/029105, Filed on Jul. 24, 2019, 10 Pages including English Translation.

(Continued)

*Primary Examiner* — Tanmay K Shah
(74) *Attorney, Agent, or Firm* — Xsensus LLP

(57) ABSTRACT

A mechanism capable of more appropriately performing antenna switching is provided. A communication device includes: a plurality of antenna panels (60) that each includes one or more antennas (51), one or more transmission analogue circuits (54) for transmitting a signal by using the antenna, and one or more reception analogue circuits (55) for receiving a signal by using the antenna; and a control section (240) that controls, on the basis of indication from a base station, the antenna panel in which antenna switching for switching of connection between the antenna and the transmission analogue circuit is to be performed among a plurality of the antenna panels, and a first resource on which the antenna switching in the corresponding antenna panel is to be performed.

17 Claims, 19 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2015/0063487 A1* | 3/2015 | Negus ................ | H04B 7/15592 |
| | | | 375/267 |
| 2019/0222279 A1* | 7/2019 | Xi ........................ | H04B 7/0491 |
| 2020/0014448 A1* | 1/2020 | Osawa ................. | H04B 7/0641 |
| 2021/0083748 A1* | 3/2021 | Guan ................... | H04B 7/0628 |

FOREIGN PATENT DOCUMENTS

| | | |
|---|---|---|
| JP | 2014-511605 A | 5/2014 |
| JP | 2016-518768 A | 6/2016 |
| WO | 2018/031869 A1 | 2/2018 |

OTHER PUBLICATIONS

Sony, "Remaining issues on SRS", 3GPP TSG RAN WG1 Meeting No. 93, R1-1806564, Busan, Korea, May 21-25, 2018, 5 pages.

\* cited by examiner

COMMUNICATION DEVICE, COMMUNICATION CONTROL METHOD AND RECORDING MEDIUM

CROSS-REFERENCE TO RELATED APPLICATIONS

The present application is based on PCT filing PCT/JP2019/029105, filed Jul. 24, 2019, which claims priority to JP 2018-150415, filed Aug. 9, 2018, the entire contents of each are incorporated herein by reference.

TECHNICAL FIELD

The present disclosure relates to a communication device, a communication control method, and a recording medium.

BACKGROUND ART

A wireless access scheme and wireless network (hereinafter, also referred to as "Long Term Evolution (LTE)", "LTE-Advanced (LTE-A)", "LTE-Advanced Pro (LTE-A Pro)", "5th Generation (5G)", "New Radio (NR)", "New Radio Access Technology (NRAT)", "Evolved Universal Terrestrial Radio Access (EUTRA)", or "Further EUTRA (FEUTRA)") for cellular mobile communication have been studied in the 3rd Generation Partnership Project (3GPP). Note that, in the following description, LTE includes LTE-A, LTE-A Pro, and EUTRA, and NR includes NRAT and FEUTRA. In LTE and NR, a base station device (base station) is also referred to as an evolved NodeB (eNodeB) in LTE and a gNodeB in NR, and a terminal device (mobile station, mobile station device, or terminal) is also referred to as a user equipment (UE). LTE and NR are cellular communication systems in which a plurality of areas covered by base stations is arranged in a form of cells. A single base station may manage a plurality of cells.

In NR, it is assumed that, in a terminal device including a plurality of antennas, analogue circuits for reception of which the number is the same as the number of antennas are provided, and analogue circuits for transmission of which the number is smaller than the number of antennas are provided. From the viewpoint of channel reciprocity, it is desirable that measurement signals corresponding to the number of antennas can be transmitted in order to estimate downlink channel quality on the basis of uplink channel quality. In this regard, Non-Patent Document 1 below discloses a technology of transmitting uplink measurement signals corresponding to the number of antennas while performing antenna switching.

CITATION LIST

Non-Patent Document

Non-Patent Document 1: Sony, "Remaining issues on SRS", R1-1806564, 3GPP TSG RAN WG1 Meeting #93, May 2018

SUMMARY OF THE INVENTION

Problems to be Solved by the Invention

However, in resources in which antenna switching is performed (wireless resources defined by frequency resources and time resources), it may be difficult to transmit and receive data due to the influence of the antenna switching. Therefore, due to the execution of antenna switching, various adverse effects may occur in communication between a terminal device and a base station.

Therefore, the present disclosure provides a mechanism capable of more appropriately performing antenna switching.

Solutions to Problems

According to the present disclosure, a communication device is provided, the communication device including: a plurality of antenna panels that each includes one or more antennas, one or more transmission analogue circuits for transmitting a signal by using the antenna, and one or more reception analogue circuits for receiving a signal by using the antenna; and a control section that controls, on the basis of indication from a base station, the antenna panel in which antenna switching for switching of connection between the antenna and the transmission analogue circuit is to be performed among the plurality of antenna panels, and a first resource on which the antenna switching in the corresponding antenna panel is to be performed.

Further, according to the present disclosure, a communication device is provided, the communication device including: a control section that indicates, to the communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among the plurality of antenna panels, and a first resource on which the antenna switching is to be performed.

Further, according to the present disclosure, a communication control method of a communication device is provided, in which the communication device includes a plurality of antenna panels that each includes one or more antennas, one or more transmission analogue circuits for transmitting a signal by using the antenna, and one or more reception analogue circuits for receiving a signal by using the antenna, and the communication control method includes: controlling, by a processor, on the basis of indication from a base station, the antenna panel in which antenna switching for switching of connection between the antenna and the transmission analogue circuit is to be performed among the plurality of antenna panels, and a first resource on which the antenna switching in the corresponding antenna panel is to be performed.

Further, according to the present disclosure, a communication control method is provided, the communication control method including: indicating, by a processor, to a communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among the plurality of antenna panels, and a first resource on which the antenna switching is to be performed.

Further, according to the present disclosure, a recording medium in which a program for causing a computer to function as a control section is recorded is provided, the computer controlling a communication device including a plurality of antenna panels that each includes one or more antennas, one or more transmission analogue circuits for transmitting a signal by using the antenna, and one or more reception analogue circuits for receiving a signal by using the antenna, and the control section controlling, on the basis of indication from a base station, the antenna panel in which antenna switching for switching of connection between the antenna and the transmission analogue circuit is to be performed among the plurality of antenna panels, and a first resource on which the antenna switching in the corresponding antenna panel is to be performed.

Further, according to the present disclosure, a recording medium in which a program for causing a computer to function as a control section is recorded is provided, the control section indicating, to a communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among the plurality of antenna panels, and a first resource on which the antenna switching is to be performed.

Effects of the Invention

According to the present disclosure, a mechanism capable of more appropriately performing antenna switching is provided. Note that effects of the present disclosure are not necessarily limited to the effects described above, and, along with or instead of the effects described above, any of the effects shown in the present specification, or other effects that can be grasped from the present specification may be achieved.

MODE FOR CARRYING OUT THE INVENTION

Hereinafter, preferred embodiments of the present disclosure will be described in detail with reference to the accompanying drawings. Note that in the present specification and the drawings, constituent elements having substantially the same functional configuration are denoted by the same reference signs, and an overlapping description is omitted.

Note that descriptions will be provided in the following order.

1. Introduction
1.1. System Configuration
1.2. Related Technologies
1.3. Outline of Technical Problem and Proposed Technology
2. Example of Configuration
2.1. Example of Configuration of Base Station
2.2. Example of Configuration of Terminal Device
3. Technical Features
4. Application Example
5. Conclusion 1. Introduction <1.1. System Configuration>

Figure 1:
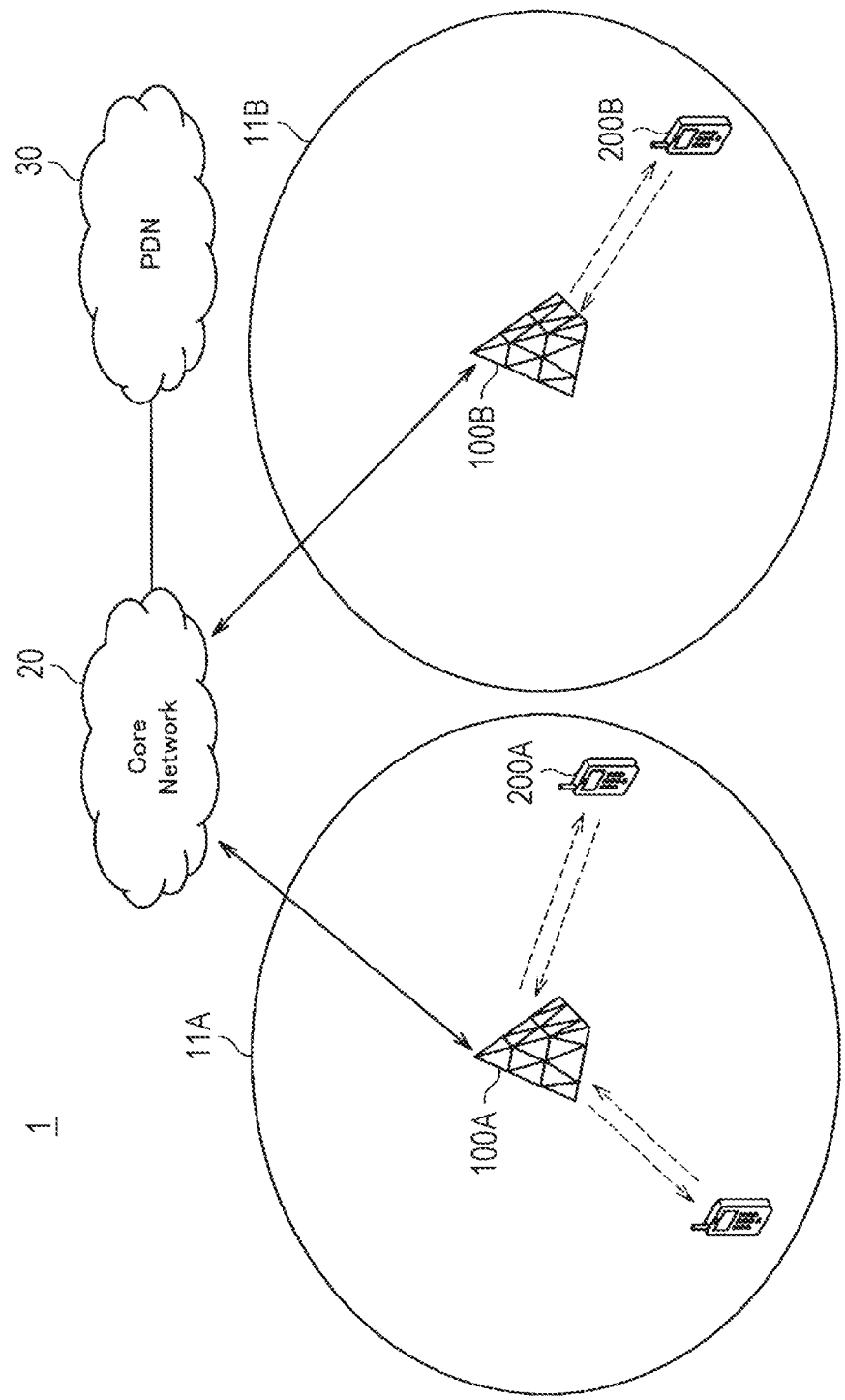
FIG. 1 is a diagram illustrating an example of an overall configuration of a system according to an embodiment of the present disclosure.

FIG. 1 is a diagram illustrating an example of an overall configuration of a system 1 according to an embodiment of the present disclosure. As illustrated in FIG. 1, the system 1 includes base stations 100 (100A and 100B), terminal devices 200 (200A and 200B), a core network 20, and a packet data network (PDN) 30.

The base station 100 is a communication device that operates a cell 11 (11A or 11B) and provides a wireless service to one or more terminal devices located inside the cell 11. For example, the base station 100A provides the wireless service to the terminal device 200A, and the base station 100B provides the wireless service to the terminal device 200B. The cell 11 can be operated according to an arbitrary wireless communication scheme such as LTE, New Radio (NR), or the like. The base station 100 is connected to the core network 20. The core network 20 is connected to the PDN 30.

The core network 20 can include, for example, a mobility management entity (MME), a serving gateway (S-GW), a PDN gateway (P-GW), a policy and charging rule function (PCRF), and a home subscriber server (HSS). The MME is a control node that handles a control plane signal, and manages a movement state of the terminal device. The S-GW is a control node that handles a user plane signal, and is a gateway device that switches between user data transfer paths. The P-GW is a control node that handles a user plane signal, and is a gateway device that serves as a connection point between the core network 20 and the PDN 30. The PCRF is a control node that performs a control related to policies such as quality of service (QoS) and the like for bearers and charging. The HSS is a control node that handles subscriber data and performs a service control.

The terminal device 200 is a communication device that performs wireless communication with the base station 100 on the basis of the control performed by the base station 100. The terminal device 200 may be a so-called user equipment (UE). For example, the terminal device 200 transmits an uplink signal to the base station 100 and receives a downlink signal from the base station 100.

<1.2. Related Technologies>

(1) BWP

Figure 2:
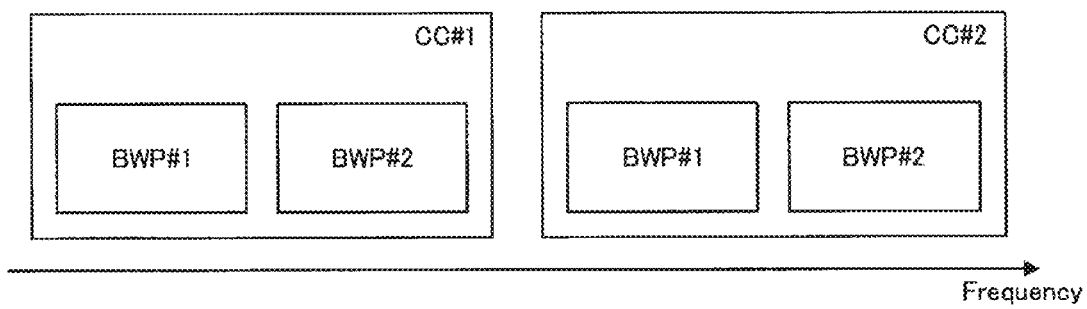
FIG. 2 is a diagram for describing a BWP.

FIG. 2 is a diagram for describing a bandwidth part (BWP). As illustrated in FIG. 2, a CC #1 includes a plurality of BWPs (#1 and #2), and a CC #2 includes a plurality of BWPs (#1 and #2). Note that, in the present specification, a number after # indicates an index. BWPs included in different CCs indicate different BWPs even in a case where they have the same index. The BWPs are a plurality of frequency bandwidths into which a CC, which is one operation bandwidth, is divided. A different subcarrier spacing can be set for each BWP.

The BWP has been standardized as a basic frame format for NR in 3GPP Rel 15. In an OFDM modulation scheme standardized by Rel 8 for LTE, the subcarrier spacing was fixed at 15 kHz. On the other hand, in Rel 15, the subcarrier spacing can be set to 60 kHz, 120 kHz, or 240 kHz. The longer the subcarrier spacing, the smaller the OFDM symbol length. For example, in LTE, since the subcarrier spacing is 15 kHz, it has been possible to transmit one slot per ms, in other words, it has been possible to transmit 14 OFDM symbols. On the other hand, in NR, it is possible to transmit two slots in a case where the subcarrier spacing is 60 kHz, four slots in a case where the subcarrier spacing is 120 kHz, and eight slots in a case where the subcarrier spacing is 240 kHz. As such, the longer the subcarrier, the smaller the OFDM symbol length. Therefore, it is possible to provide a frame configuration suitable for low-delay communication.

In NR, BWPs with different subcarrier spacings can be provided at the same time. Therefore, in NR, a plurality of BWPs corresponding to different use cases can be provided at the same time.

(2) Number of Active BWPs

A BWP on which transmission and reception can be performed is also referred to as an active BWP. Further, the number of BWPs on which transmission and reception can be performed at the same time is also referred to as the number of active BWPs. The number of active BWPs of the base station 100 is plural. On the other hand, the number of active BWPs of the terminal device 200 may be one. It is a matter of course that a terminal device 200 with a plurality of active BWPs can also be expected to appear in the future. These scenarios are shown in Table 1 below.

TABLE 1

Scenarios Related to Number of Active BWPs

| Scenarios | Active BWP |
|---|---|
| 3GPP Rel15 | Terminal Device Can Use Only One BWP at the Same Time |
| Possible Scenario in Future | Terminal Device Can Use a Plurality of BWPs at the Same Time |

Note that, in the technology according to the present disclosure, it is assumed that the number of active BWPs of the terminal device 200 is plural.

(3) Codebook-Based Beamforming

The base station 100 can improve, for example, communication quality, by performing beamforming to perform communication with the terminal device 200. A beamforming method includes a method of generating a beam that follows the terminal device 200 and a method of selecting, from candidate beams, a beam that follows the terminal device 200. It is difficult to adopt the former method in future wireless communication systems (for example, 5G) because a computational cost is involved each time a beam is generated. On the other hand, the latter method is adopted also in full dimension multiple input multiple output (FD-MIMO) of release 13 of third generation partnership project (3GPP). The latter method is also referred to as codebook-based beamforming.

In the codebook-based forming, the base station 100 prepares (that is, generates) a beam in all directions in advance, selects, from the beams prepared in advance, a beam suitable for a target terminal device 200, and performs communication with the terminal device 200 using the selected beam. For example, in a case where the base station 100 can perform communication at 360 degrees in a horizontal direction, for example, 360 types of beams are prepared in increments of 1 degree. In a case where the beams are set so that the beams overlap with each other by half, the base station 100 prepares 720 types of beams. In a vertical direction, the base station 100 prepares beams corresponding to 180 degrees, for example, from −90 degrees to +90 degrees.

Note that since the terminal device 200 only observes the beam, there is less necessary to know the existence of a codebook in the base station 100.

Hereinafter, a plurality of beams prepared in advance by the base station 100 is also referred to as a beam group. The beam group can be defined for each frequency band, for example. Furthermore, the beam group can be defined for each Rx/Tx beam and for each of downlink/uplink.

(4) Beam Sweeping

In NR, it has been considered to perform beam sweeping, in which a measurement signal (known signal) is transmitted or received using each of a plurality of beams belonging to a beam group, in order to select an optimal beam to be used for communication. The measurement signal may also be referred to as a reference signal. An optimal transmission beam (hereinafter, also referred to as a Tx beam) can be selected on the basis of a measurement result of the measurement signal transmitted while performing beam sweeping. An example thereof will be described with reference to FIG. 3.

Figure 3:
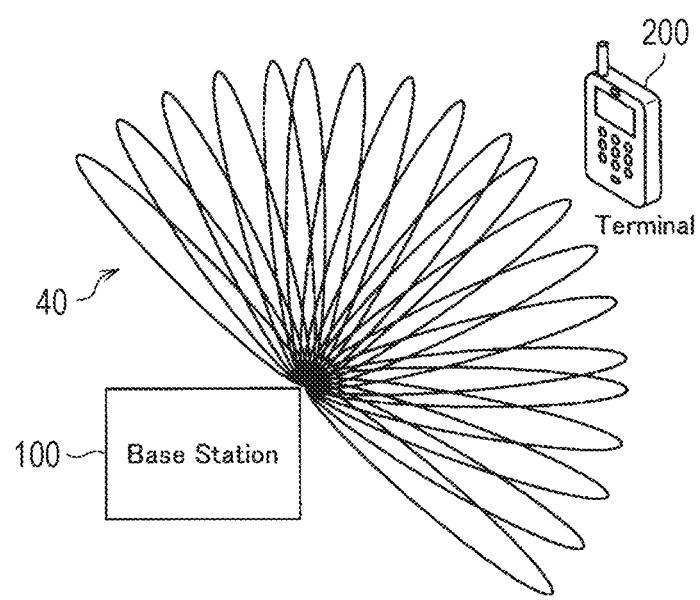
FIG. 3 is a diagram for describing beam sweeping.

FIG. 3 is a diagram for describing the beam sweeping. In the example illustrated in FIG. 3, the base station 100 transmits a measurement signal while performing the beam sweeping (that is, switching the Tx beam) by using a beam group 40. Note that, hereinafter, transmission while the beam sweeping is performed is also referred to as beam sweeping transmission. Further, the terminal device 200 measures a beam-sweeping transmitted measurement signal and determines which Tx beam is the most suitable for reception. In this way, the optimal Tx beam of the base station 100 is selected. Note that the base station 100 can select an optimal Tx beam of the terminal device 200 by exchanging the base station 100 and the terminal device 200 and performing a similar procedure.

On the other hand, an optimal reception beam (hereinafter, also referred to as an Rx beam) can be selected on the basis of a measurement result obtained by receiving a measurement signal while performing the beam sweeping. For example, the terminal device 200 transmits a measurement signal in uplink. Then, the base station 100 receives the measurement signal while performing the beam sweeping (that is, switching the Rx beam), and determines which Rx beam is the most suitable for reception. In this way, the optimal Rx beam of the base station 100 is selected. Note that the terminal device 200 can select an optimal Rx beam of the terminal device 200 by exchanging the base station 100 and the terminal device 200 and performing a similar procedure. Further, hereinafter, reception while the beam sweeping is performed is also referred to as beam sweeping reception.

A side that receives and measures a beam-sweeping transmitted measurement signal reports a measurement result to a side that transmits the measurement signal. The measurement result includes information indicating which Tx beam is optimal. The optimal Tx beam is, for example, a Tx beam with the highest received power. The measurement result may include information indicating one Tx beam with the highest received power, or may include information indicating the top K Tx beams with high received power. The measurement result includes, for example, identification information of a Tx beam (for example, an index of a beam) and information indicating the magnitude of received power of a Tx beam (for example, reference signal received power (RSRP)) in association with each other.

Note that, in the Tx beam selection procedure, a measurement signal is beam-sweeping transmitted by using each of a plurality of Tx beams belonging to a beam group. It can be said that each Tx beam is identified by a resource called a measurement signal. The measurement signal transmitted using a beam may also be referred to as a beam resource. Furthermore, a measurement signal that is beam-sweeping transmitted by using a beam group may also be referred to as a beam resource group.

(5) CSI Acquisition Procedure

A channel state information (CSI) acquisition procedure is performed after an optimal beam is selected by the beam selection procedure accompanied by the beam sweeping described above. The channel quality in communication using the selected beam is acquired by performing the CSI acquisition procedure. For example, a channel quality indicator (CQI) is acquired in the CSI acquisition procedure.

The channel quality is used to determine a communication parameter such as a modulation scheme or the like. In a case where a modulation scheme that can transmit only a small number of bits, even with a favorable channel quality, for example, quadrature phase shift keying (QPSK), is adopted, a throughput is low. On the other hand, in a case where a modulation scheme that can transmit a large number of bits even with a poor channel quality, for example, 256-quadrature amplitude modulation (256-QAM), is adopted, data reception fails on a reception side and a throughput is low. As such, it is important to acquire the channel quality correctly in improving a throughput.

Figure 4:
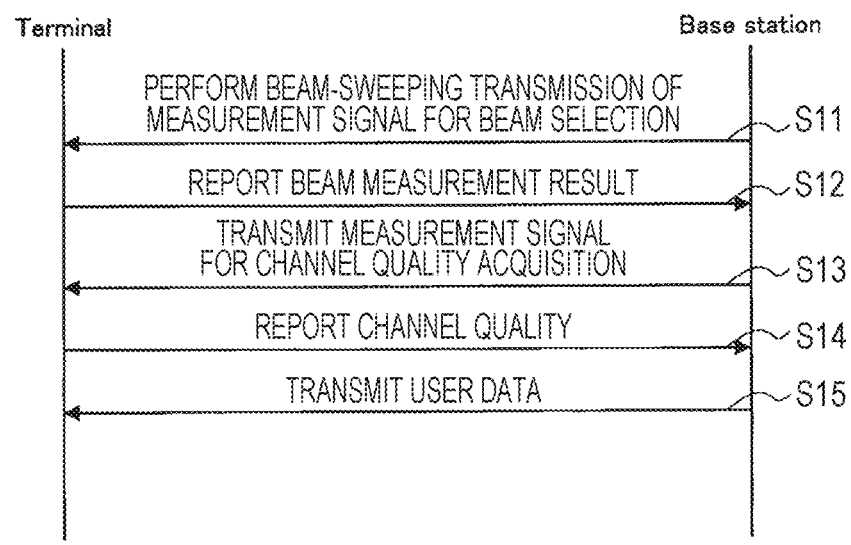
FIG. 4 is a sequence diagram illustrating an example of a flow of a typical beam selection procedure and CSI acquisition procedure performed by a base station and a terminal device.

FIG. 4 is a sequence diagram illustrating an example of a flow of a typical beam selection procedure and CSI acquisition procedure performed by a base station and a terminal device. As illustrated in FIG. 4, the base station performs beam-sweeping transmission of a measurement signal for beam selection (Step S11). Next, the terminal device measures the measurement signal for beam selection and reports a beam measurement result to the base station (Step S12). Such a measurement result includes, for example, information indicating a result of selection of an optimal Tx beam of the base station. Next, the base station transmits a measurement signal for channel quality acquisition by using the selected optimal beam (Step S13). Next, the terminal device reports the channel quality acquired on the basis of a measurement result of the measurement signal to the base station (Step S14). Then, the base station transmits user data to the terminal device by using a communication parameter based on the reported channel quality (Step S15).

(6) Channel Reciprocity

Downlink channel quality is measured on the basis of a measurement signal transmitted in downlink. On the other hand, the downlink channel quality can also be measured on the basis of a measurement signal transmitted in uplink. This is because an uplink channel and a downlink channel have reversibility, and the quality of these channels is basically the same. Such reversibility is also referred to as channel reciprocity.

In a case of measuring the downlink channel quality on the basis of a downlink measurement signal, a measurement result of the measurement signal for channel quality acquisition is reported as shown in Step S14 of FIG. 4. Such reporting of a measurement result can cause significant overhead. A channel can be represented by an N×M matrix, in which the number of transmitting antennas is M and the number of receiving antennas is N. Each element of the matrix is a complex number corresponding to IQ. For example, in a case where each I/Q is represented by 10 bits, the number of transmitting antennas is 100, and the number of receiving antennas is 8, 16000 (8×100×2×10) bits are required for reporting a channel quality measurement result, which causes significant overhead.

On the other hand, in a case of measuring the downlink channel quality on the basis of an uplink measurement signal, it is not necessary to report a measurement result, because an entity that performs the measurement is a base station. Therefore, it is possible to reduce the overhead related to reporting of a measurement result and improve a throughput by measuring the downlink channel quality on the basis of an uplink measurement signal. A flow of processing in a case of measuring the downlink channel quality on the basis of an uplink measurement signal will be described with reference to FIG. 5.

Figure 5:
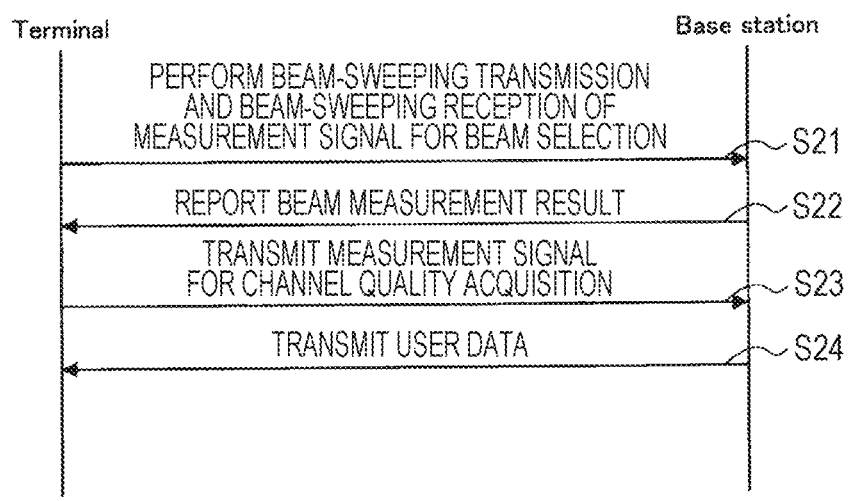
FIG. 5 is a sequence diagram illustrating another example of the flow of the typical beam selection procedure and CSI acquisition procedure performed by a base station and a terminal device.

FIG. 5 is a sequence diagram illustrating another example of the flow of the typical beam selection procedure and CSI acquisition procedure performed by a base station and a terminal device. As illustrated in FIG. 5, the terminal device performs beam-sweeping transmission of a measurement signal for beam selection, and the base station receives the measurement signal while performing beam sweeping (Step S21). Here, the base station selects an optimal Tx beam of the terminal device and an optimal Rx beam of the base station on the basis of a measurement result. Next, the base station reports a beam measurement result to the terminal device (Step S22). Such a measurement result includes information indicating a result of selection of an optimal Tx beam of the terminal device. Next, the terminal device transmits a measurement signal for channel quality acquisition by using the selected Tx beam (Step S23). The base station acquires uplink channel quality on the basis of the measurement result, and acquires downlink channel quality on the basis of the uplink channel quality. Then, the base station transmits user data to the terminal device by using a communication parameter based on the acquired downlink channel quality (Step S24).

(7) Antenna Switching

In some cases, it is difficult to utilize the channel reciprocity described above. Such cases include a case where the number of antennas, the number of reception analogue circuits, and the number of transmission analogue circuits are imbalanced. An example thereof will be described with reference to FIG. 6.

Figure 6:
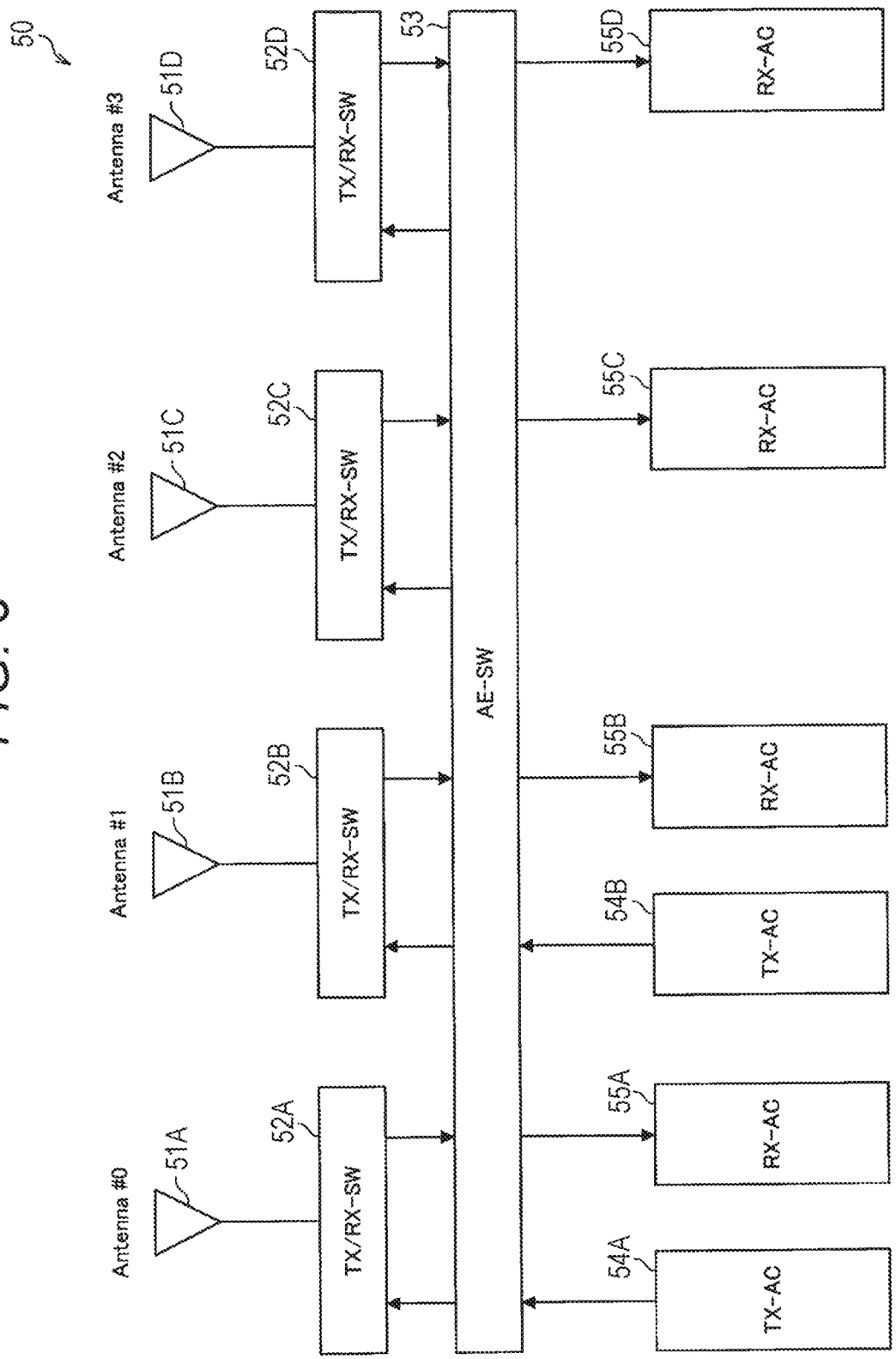
FIG. 6 is a diagram for describing antenna switching.

FIG. 6 is a diagram for describing antenna switching. An antenna set 50 illustrated in FIG. 6 includes four antennas 51 (51A to 51D), four transmission/reception switches 52 (52A to 52D), an antenna element switch 53, two transmission analogue circuits 54 (54A and 54B), and reception analogue circuits 55 (55A to 55D). The respective antennas 51 are also referred to as antennas #0 to #3.

The antenna 51 radiates a signal as radio waves in the air, or converts radio waves in the air into a signal. The transmission/reception switch 52 is a switch that switches between outputting of a signal to be transmitted to the antenna 51 and outputting of a signal received by the antenna 51 to the antenna element switch 53. The antenna element switch 53 is a switch that switches between connection of the transmission/reception switch 52 and the transmission analogue circuit 54 and connection of the transmission/reception switch 52 and the reception analogue circuit 55. The transmission analogue circuit 54 is a circuit that performs analogue processing for signal transmission using the antenna 51. The reception analogue circuit 55 is a circuit that performs analogue processing for signal reception using the antenna 51.

Each antenna 51 is switchably connected to the transmission analogue circuit 54 or the reception analogue circuit 55 via the transmission/reception switch 52 and the antenna element switch 53. By connecting an arbitrary transmission/reception switch 52 to the transmission analogue circuit 54 or the reception analogue circuit 55, the antenna element switch 53 switches between reception of a signal by each antenna 51 and transmission of a signal.

As illustrated in FIG. 6, the number of reception analogue circuits 55 is four, which is the same as the number of antennas 51. On the other hand, the number of transmission analogue circuits 54 is two, which is less than the number of antennas 51. Such a state is caused, for example, by reducing the number of transmission analogue circuits 54 for the purpose of cost reduction. The antenna set 50 can receive signals by using four antennas 51 at the same time. On the other hand, the antenna set 50 can transmit signals by using two antennas 51 at the same time. In other words, the antenna set 50 cannot transmit signals by using four antennas 51 at the same time. Therefore, a terminal device including the antenna set 50 cannot transmit measurement signals for channel quality acquisition by using four antennas 51 at the same time. Since the number of antennas 51 that can be used simultaneously by the terminal device differs between downlink and uplink, it is difficult for the base station to acquire downlink channel quality by using the channel reciprocity.

As a countermeasure, there is a technology called antenna switching. An example thereof will be described with reference to FIGS. 7 to 9.

Figure 7:
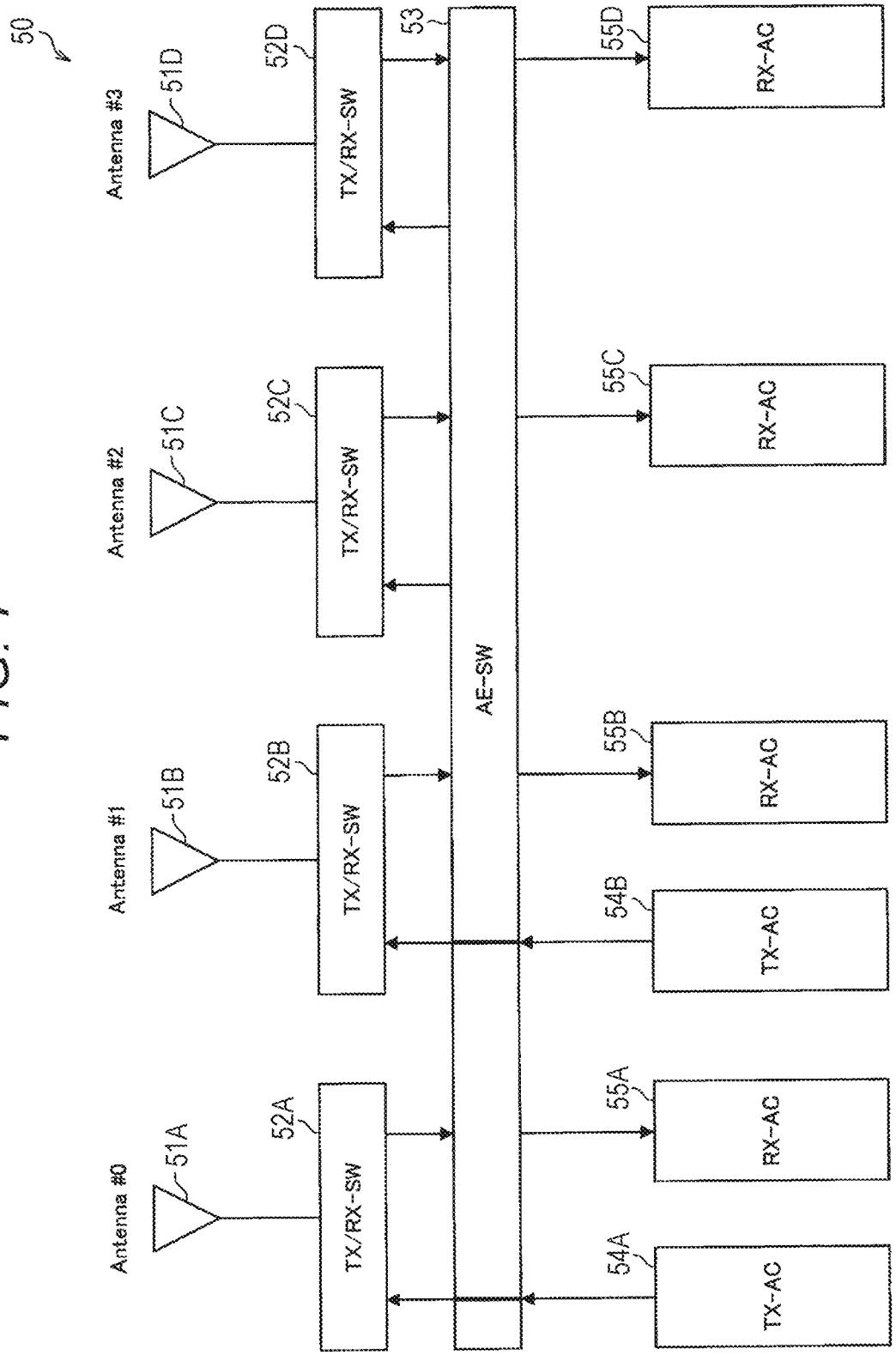
FIG. 7 is a diagram for describing an example of the antenna switching.
Figure 8:
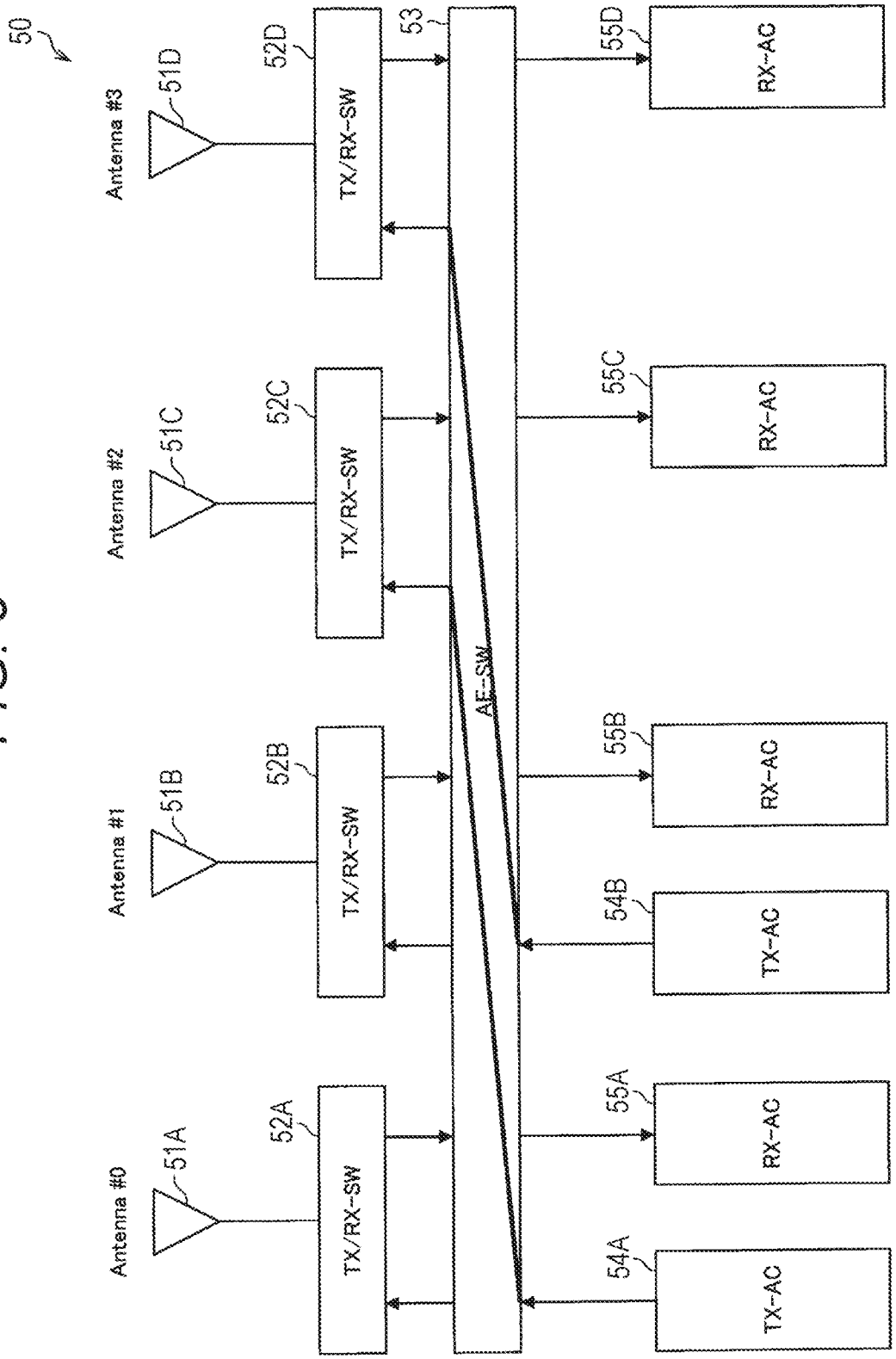
FIG. 8 is a diagram for describing the example of the antenna switching.

FIGS. 7 and 8 are diagrams for describing an example of the antenna switching. As illustrated in FIG. 7, the antenna element switch 53 connects the transmission analogue circuit 54A to the transmission/reception switch 52A and the antenna 51A, and connects the transmission analogue circuit 54B to the transmission/reception switch 52B and the antenna 51B. In this state, the terminal device including the antenna set 50 transmits measurement signals for channel quality acquisition by using the antennas 51A and 51B. Thereafter, as illustrated in FIG. 8, the antenna element switch 53 connects the transmission analogue circuit 54A to the transmission/reception switch 52C and the antenna 51C, and connects the transmission analogue circuit 54B to the transmission/reception switch 52D and the antenna 51D. In this state, the terminal device including the antenna set 50 transmits measurement signals for channel quality acquisition using the antennas 51C and 51D. Such switching of connection between the antenna 51 and the transmission analogue circuit 54 is also referred to as antenna switching.

Figure 9:
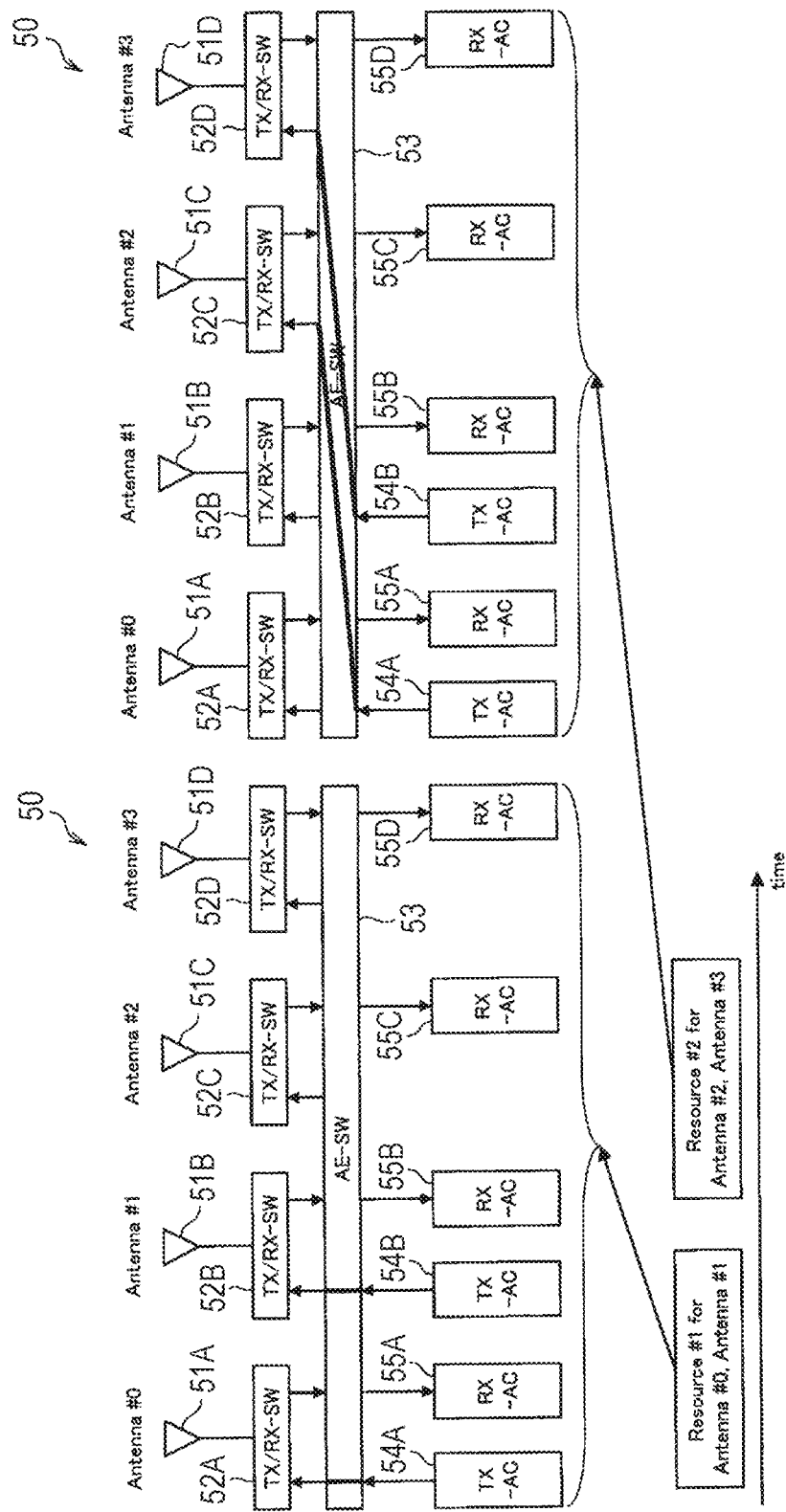
FIG. 9 is a diagram illustrating an example of a relationship between the antenna switching and time resources in which the antenna switching is performed.

FIG. 9 is a diagram illustrating an example of a relationship between the antenna switching and resources in which the antenna switching is performed. FIG. 9 illustrates a resource #1 used by the antenna set 50 in the state illustrated in FIG. 7 for transmission of measurement signals using the antennas #0 and #1, and a resource #2 used by the antenna set 50 in the state illustrated in FIG. 8 for transmission of measurement signals using the antennas #2 and #3. Here, the resource #1 and the resource #2 are set as different time resources. Therefore, transmission of measurement signals using a total of four antennas 51 in a manner that two antennas are used in order each time is performed by using these different time resources. With this arrangement, it is possible to transmit measurement signals by using a total of four antennas 51 as in a case of downlink, and thus the channel reciprocity can be utilized.

Note that a signal for antenna switching is transmitted at the time of performing the antenna switching. The signal for antenna switching is transmitted, for example, in a certain time resource for a certain BWP. That is, the antenna switching is performed in a certain time resource for a certain BWP. The signal for antenna switching is, for example, a measurement signal.

Such transmission of a measurement signal using the antenna switching has already been standardized in LTE.

Note that a device including the antenna set 50 as described above with reference to FIG. 6 and the like is also referred to as an antenna panel. The antenna panel is a device including one or more antennas, one or more transmission analogue circuits for transmission of a signal using the antenna, and one or more reception analogue circuits for reception of a signal using the antenna.

<1.3. Outline of Technical Problem and Proposed Technology>

(1) First Technical Problem and First Proposed Technology Therefor

The first technical problem is that it is difficult to perform normal transmission processing in a time resource in which antenna switching is performed in the antenna panel that performs the antenna switching, and thus the normal transmission processing is interrupted in time. Note that the normal transmission processing is, for example, processing of transmitting a data signal including user data.

For example, a case where the antenna switching is performed on a certain BWP belonging to a certain CC is assumed. In this case, since the antennas used are common in the antenna panel that currently performs the antenna switching, the fluctuation of the analogue circuit caused at the time of the antenna switching affects transmission performed on other BWPs. Therefore, in the antenna panel that currently performs the antenna switching, it is difficult to perform the normal transmission processing not only on the BWP on which the antenna switching is currently performed, but also on other BWPs. For example, in a case where there are 32 CCs and four BWPs per CC, there are 128 (32×4) BWPs. In a case where the antenna switching is performed on one of the BWPs, it was difficult to perform the normal transmission processing on other 127 BWPs in the same time resource.

Therefore, in the first proposed technology, the terminal device 200 includes a plurality of antenna panels. Further, the terminal device 200 performs the normal transmission processing by using an antenna panel that does not currently perform the antenna switching, other than an antenna panel that currently performs the antenna switching. Moreover, in a case of performing the antenna switching in each antenna panel, the terminal device 200 performs the antenna switching for each antenna panel in each of different time resources. As a result, even in a case where the normal transmission processing is interrupted in time in each antenna panel, the normal transmission processing can be performed without interruption in time as a whole.

However, it is difficult even for the antenna panel that does not currently perform the antenna switching to perform normal transmission processing on a BWP on which the antenna switching in another antenna panel is currently performed. This is because a signal for antenna switching is transmitted on the BWP on which the antenna switching is currently performed, which has an influence.

Therefore, the terminal device 200 performs the normal transmission processing by using the antenna panel that does not currently perform the antenna switching on above-described other BWPs different from the BWP on which the antenna switching is currently performed. As a result, the terminal device 200 can perform the normal transmission processing without being affected by the antenna switching.

(2) Second Technical Problem and Second Proposed Technology Therefor

According to the first proposed technology, in a case of performing the antenna switching in each antenna panel, the antenna switching for each antenna panel is performed in each of different time resources. However, in a case where the antenna switching is currently performed in any antenna panel, it is difficult even for an antenna panel that does not currently perform the antenna switching to perform the normal transmission processing on a BWP on which the antenna switching in another antenna panel is currently performed. Therefore, it is desirable that a period during which the antenna switching is performed in any antenna panel is short.

Therefore, in the second proposed technology, in a case of performing the antenna switching in each antenna panel, the terminal device 200 performs the antenna switching for each antenna panel in an overlapping time resource. By doing so, the period during which the antenna switching is performed in any antenna panel is minimized, and as a result, the amount of resources available for the normal transmission processing can be increased and a throughput can be improved.

(3) Third Technical Problem and Third Proposed Technology Therefor

In order to perform the antenna switching under the control of the base station 100, it is desirable that information regarding the antenna switching of the terminal device 200 is reported to the base station 100. For example, an antenna configuration may be different for each antenna panel. Furthermore, a mode in which the fluctuation of the analogue circuit caused at the time of the antenna switching affects other BWPs may be different for each antenna panel.

Therefore, in the third proposed technology, the terminal device 200 reports information regarding the antenna switching to the base station 100. The information regarding the antenna switching includes antenna panel configuration information as described later and capability information as described later. By reporting these information, the base station 100 can perform an appropriate control related to the antenna switching.

2. Example of Configuration

<2.1. Example of Configuration of Base Station>

Figure 10:
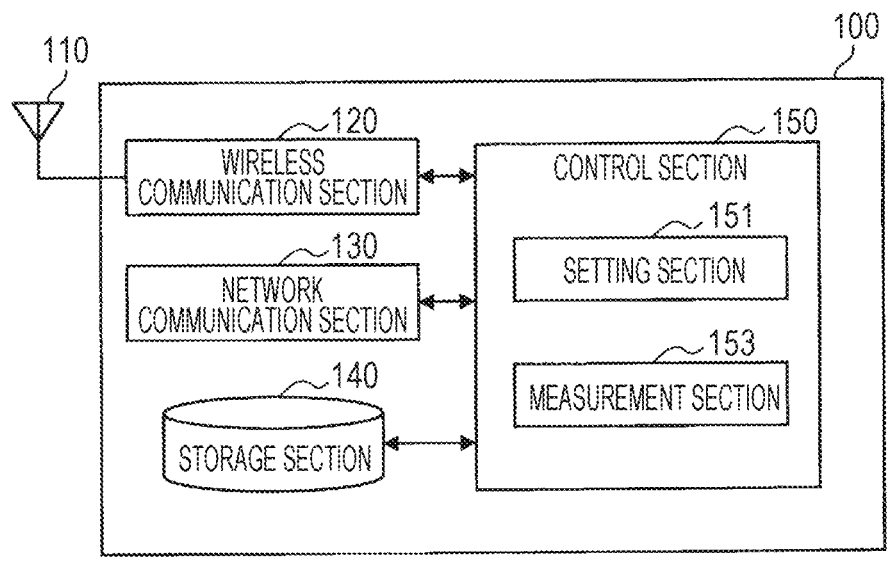
FIG. 10 is a block diagram illustrating an example of a configuration of a base station according to the present embodiment.

FIG. 10 is a block diagram illustrating an example of a configuration of the base station 100 according to the present embodiment. Referring to FIG. 10, the base station 100 includes an antenna section 110, a wireless communication section 120, a network communication section 130, a storage section 140, and a control section 150.

(1) Antenna Section 110

The antenna section 110 radiates a signal output from the wireless communication section 120 as radio waves in the air. Furthermore, the antenna section 110 converts radio waves in the air into a signal and outputs the signal to the wireless communication section 120.

In particular, in the present embodiment, the antenna section 110 includes a plurality of antenna elements and can form a beam.

(2) Wireless Communication Section 120

The wireless communication section 120 transmits and receives a signal. For example, the wireless communication section 120 transmits a downlink signal to a terminal device and receives an uplink signal from a terminal device.

In particular, in the present embodiment, the wireless communication section 120 can perform communication with a terminal device by using a plurality of beams formed by the antenna section 110.

(3) Network Communication Section 130

The network communication section 130 transmits and receives information. For example, the network communication section 130 transmits information to another node and receives information from another node. Examples of the another node described above include other base stations and core network nodes.

(4) Storage Section 140

The storage section 140 temporarily or permanently stores a program for the operation of the base station 100 and various data.

(5) Control Section 150

The control section 150 controls the entire operation of the base station 100 to provide various functions of the base station 100. The control section 150 includes a setting section 151 and a measurement section 153.

The setting section 151 has a function of performing setting related to communication with the terminal device 200. For example, the setting section 151 sets an antenna panel for performing the antenna switching and sets a first resource for performing the antenna switching. In addition, the setting section 151 sets a second resource for the normal transmission processing during the antenna switching. Further, the setting section 151 notifies the terminal device 200 of information indicating a setting result (corresponding to indication information as described later).

The measurement section 153 has a function of measuring an uplink measurement signal that is transmitted from the terminal device 200 and performing various processing on the basis of a measurement result. For example, the measurement section 153 measures a measurement signal that is beam-sweeping transmitted from the terminal device 200 as described above with reference to FIG. 5, and selects an optimal Tx beam of the terminal device 200 and an optimal Rx beam of the base station 100. Further, the measurement section 153 measures a measurement signal that is transmitted from the terminal device 200 by using the optimal Tx beam and acquires uplink channel quality as described above with reference to FIG. 5. Further, the measurement section 153 acquires downlink channel quality on the basis of the acquired uplink channel quality.

The control section 150 can further include other constituent elements other than these constituent elements. That is, the control section 150 can perform operations other than the operations of these constituent elements.

<2.2. Example of Configuration of Terminal Device>

Figure 11:
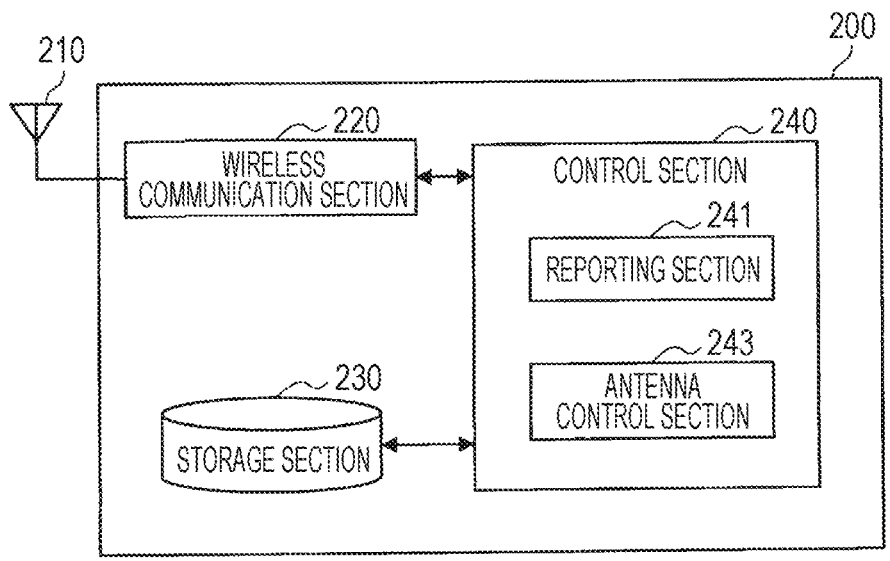
FIG. 11 is a block diagram illustrating an example of a configuration of a terminal device according to the present embodiment.

FIG. 11 is a block diagram illustrating an example of a configuration of the terminal device 200 according to the present embodiment. Referring to FIG. 11, the terminal device 200 includes an antenna section 210, a wireless communication section 220, a storage section 230, and a control section 240.

(1) Antenna Section 210

The antenna section 210 radiates a signal output from the wireless communication section 220 as radio waves in the air. Furthermore, the antenna section 210 converts radio waves in the air into a signal and outputs the signal to the wireless communication section 220.

In particular, in the present embodiment, the antenna section 210 includes a plurality of antenna elements and can form a beam.

(2) Wireless Communication Section 220

The wireless communication section 220 transmits and receives a signal. For example, the wireless communication section 220 receives a downlink signal from a base station and transmits an uplink signal to a base station.

In particular, in the present embodiment, the wireless communication section 220 can perform communication with a base station by using a plurality of beams formed by the antenna section 210.

Here, in the present embodiment, the antenna section 210 and the wireless communication section 220 each include a plurality of antenna panels 60, which will be described later with reference to FIG. 12. For example, the antenna section 210 corresponds to an antenna 51 illustrated in FIG. 12. Further, for example, the wireless communication section 220 corresponds to a transmission/reception switch 52, an antenna element switch 53, a transmission analogue circuit 54, and a reception analogue circuit 55 illustrated in FIG. 12.

(3) Storage Section 230

The storage section 230 temporarily or permanently stores a program for the operation of the terminal device 200 and various data.

(4) Control Section 240

The control section 240 controls the entire operation of the terminal device 200 to provide various functions of the terminal device 200. The control section 240 includes a reporting section 241 and an antenna control section 243.

The reporting section 241 has a function of reporting, to the base station 100, various information used for a control regarding antenna switching, the control being performed by the base station 100. For example, the reporting section 241 reports, to the base station 100, the antenna panel configuration information and the capability information as described later.

The antenna control section 243 has a function of controlling the execution of the antenna switching on the basis of the control performed by the base station 100. For example, the antenna control section 243 performs the antenna switching in an antenna panel 60 indicated by the base station 100 among the plurality of antenna panels 60 by using the first resource indicated by the base station 100. Further, the antenna control section 243 has a function of controlling the normal transmission processing performed in an antenna panel 60 that does not currently perform the antenna switching, on the basis of the control performed by the base station 100. For example, the antenna control section 243 performs the normal transmission processing in an antenna panel 60 that does not currently perform the antenna switching among the plurality of antenna panels 60 by using the second resource indicated by the base station 100.

The control section 240 can further include other constituent elements other than these constituent elements. That is, the control section 240 can perform operations other than the operations of these constituent elements.

3. Technical Features (1) Plurality of Antenna Panels

Figure 12:
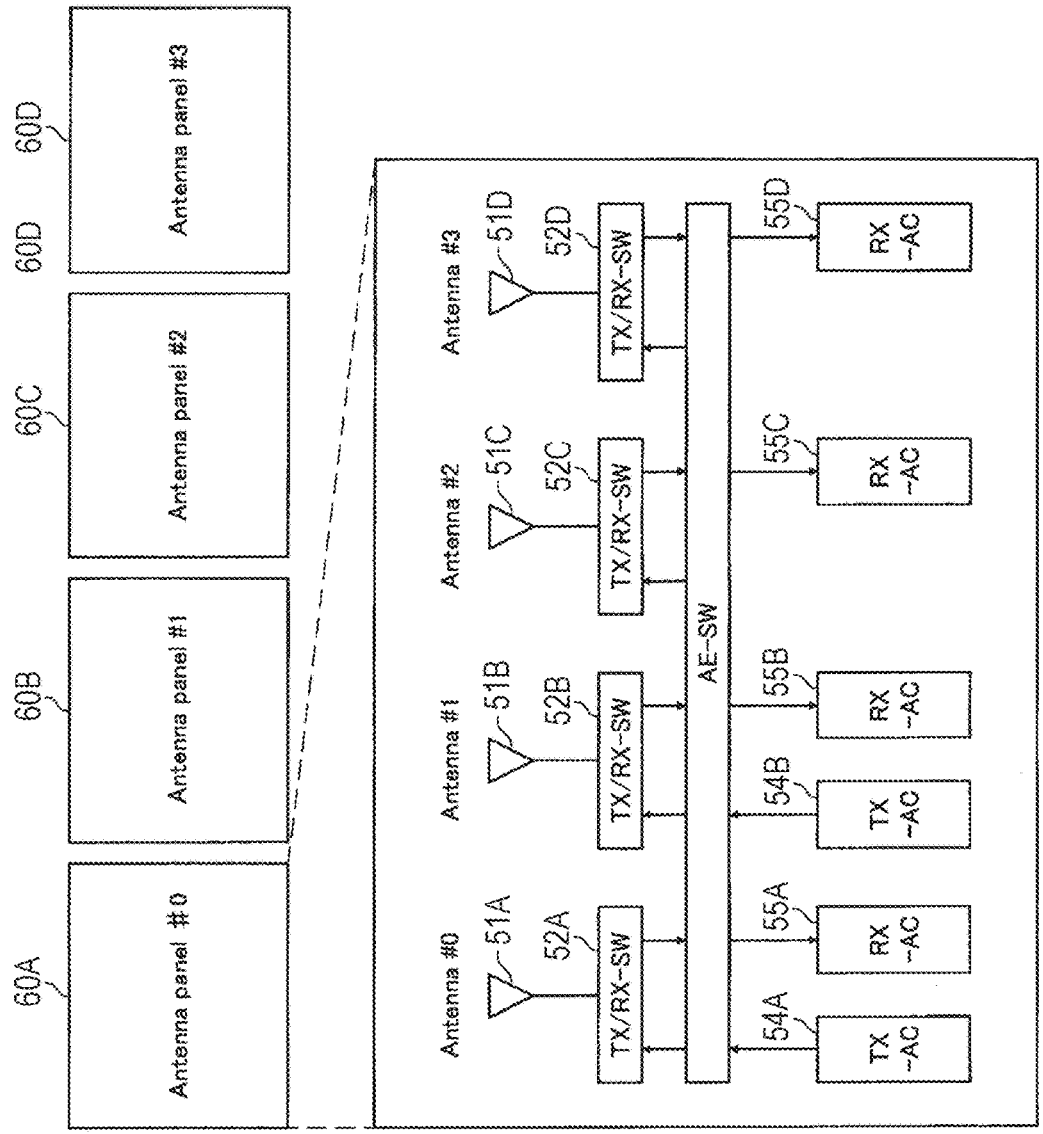
FIG. 12 is a diagram illustrating an example of a configuration of a plurality of antenna panels included in the terminal device according to the present embodiment.

FIG. 12 is a diagram illustrating an example of a configuration of the plurality of antenna panels 60 included in the terminal device 200 according to the present embodiment. As illustrated in FIG. 12, the terminal device 200 includes the plurality of antenna panels 60 (60A to 60D). The respective antenna panels 60 are also referred to as antenna panels #0 to #3. The antenna panel 60A includes a component similar to the antenna set 50 described above with reference to FIG. 6. Each of the antenna panels 60B to 60D can include an antenna set 50 having a configuration that is the same as or different from that of the antenna panel 60A. For example, in a case where 16 antennas need to be prepared, the terminal device 200 may include four antenna panels 60 each including four antennas.

The terminal device 200 transmits a signal using each of the plurality of antenna panels 60. A CC and a BWP used by each of the plurality of antenna panels 60 may be different or the same.

(2) Antenna Switching for Each Antenna Panel

Hereinafter, antenna switching for each antenna panel will be described. The present technology relates to the first proposed technology and the second proposed technology.

The base station 100 (for example, the setting section 151) indicates, to the terminal device 200 including the plurality of antenna panels 60, an antenna panel 60 in which antenna switching for switching of connection between the antenna 51 and the transmission analogue circuit 54 is to be performed, among the plurality of antenna panels 60, and the first resource on which the antenna switching in the corresponding antenna panel 60 is to be performed. The first resource is a wireless resource specified by a frequency resource and a time resource to be used for the antenna switching. Furthermore, the first resource is a wireless resource specified by a BWP and a time resource to be used for the antenna switching. The first resource can be configured for each terminal device 200 and for each antenna panel 60. Hereinafter, the indication from the base station 100 is also referred to as indication information. The indication information includes one or more combinations of an antenna panel 60 and a first resource on which the antenna switching in the antenna panel 60 is to be performed.

Further, the terminal device 200 (for example, the antenna control section 243) controls, on the basis of the indication information from the base station 100, the antenna panel 60 in which antenna switching for switching of connection between the antenna 51 and the transmission analogue circuit 54 is to be performed, among the plurality of antenna panels 60, and the first resource on which the antenna switching in the corresponding antenna panel 60 is to be performed. More specifically, the terminal device 200 performs antenna switching in the antenna panel 60 indicated by the base station 100 among the plurality of antenna panels 60 by using the first resource indicated by the base station 100.

The indication information can include information that designates the second resource on which signal transmission using an antenna panel 60 that does not currently perform the antenna switching is to be performed in a time resource for the first resource on which another antenna panel 60 among the plurality of antenna panels 60 currently performs the antenna switching. Further, the terminal device 200 performs, on the basis of the corresponding indication information, signal transmission using an antenna panel 60 that does not currently perform the antenna switching, on the second resource configured in a time resource in which another antenna panel 60 currently performs the antenna switching. As described above, it is difficult to perform the normal transmission processing in an antenna panel 60 that currently performs the antenna switching, while the normal transmission processing can be performed in an antenna panel 60 that does not currently perform the antenna switching. Therefore, it is possible to improve a throughput by performing the normal transmission processing in an antenna panel 60 that does not currently perform the antenna switching The second resource can be configured for each terminal device 200 and for each antenna panel 60.

The second resource is a frequency resource different from the first resource on which another antenna panel 60 currently performs the antenna switching. Further, a time resource for the second resource configured for a certain antenna panel 60 is a time resource in which another antenna panel 60 currently performs the antenna switching.

Specifically, the second resource may include a frequency resource that belongs to a CC different from that of the first resource on which another antenna panel currently performs the antenna switching. For example, a case where, in an environment where CCs #0 to #3 exist and each CC includes BWPs #0 to #3, a first antenna panel 60 performs the antenna switching in a certain time resource for the BWP #0 belonging to the CC #0 is assumed. In this case, a second antenna panel 60 may perform the normal transmission processing on the BWPs #0 to #3 belonging to the CCs #1 to #3 of the corresponding time resource. That is, the second resource may be at least one of the BWPs #0 to #3 in the CCs #1 to #3.

Further, the second resource may include a frequency resource that belongs to the same CC as that of the first resource on which another antenna panel currently performs the antenna switching, and that is different from the first resource on which another antenna panel currently performs the antenna switching. For example, a case where, in an environment where CCs #0 to #3 exist and each CC includes BWPs #0 to #3, a first antenna panel 60 performs the antenna switching in a certain time resource for the BWP #0 belonging to the CC #0 is assumed. In this case, the second antenna panel 60 may perform the normal transmission processing on the BWPs #1 to #3 belonging to the CC #0 of the corresponding time resource. That is, the second resource may be one of the BWPs #1 to #3 in the CC #0.

As described in the first technical problem, it is difficult for the antenna panel 60 that currently performs the antenna switching to perform the normal transmission processing. Further, it is difficult even for the antenna panel 60 that does not currently perform the antenna switching to perform the normal transmission processing on a BWP on which the antenna switching in another antenna panel 60 is currently performed. As a result, by configuring the second resource described above, the antenna panel 60 that does not currently perform the antenna switching can perform the normal transmission processing on a BWP other than a BWP on which the antenna switching is currently performed.

The indication information includes transmission permission for a signal to be transmitted by using the antenna panel 60 that does not currently perform the antenna switching among the plurality of antenna panels 60. In a case where the transmission permission is obtained, the terminal device 200 performs the normal transmission processing on the second resource by using the antenna panel 60 that does not currently perform the antenna switching. On the other hand, the terminal device 200 does not transmit a signal by using the antenna panel 60 that does not currently perform the antenna switching, unless the transmission permission is obtained.

Hereinafter, a method of performing the antenna switching for each antenna panel 60 will be described.

First Antenna Switching

The first antenna switching is a method in which the antenna switching is performed for each antenna panel 60 in each of different time resources. The present method relates to the above-described first proposed technology.

In the present method, the indication information includes information for indicating the antenna switching in the plurality of antenna panels 60 to be performed in different time resources. The terminal device 200 (for example, the antenna control section 243) performs, on the basis of the corresponding indication information, the antenna switching in the plurality of antenna panels 60 in different time resources. This will be specifically described with reference to FIG. 13.

Figure 13:
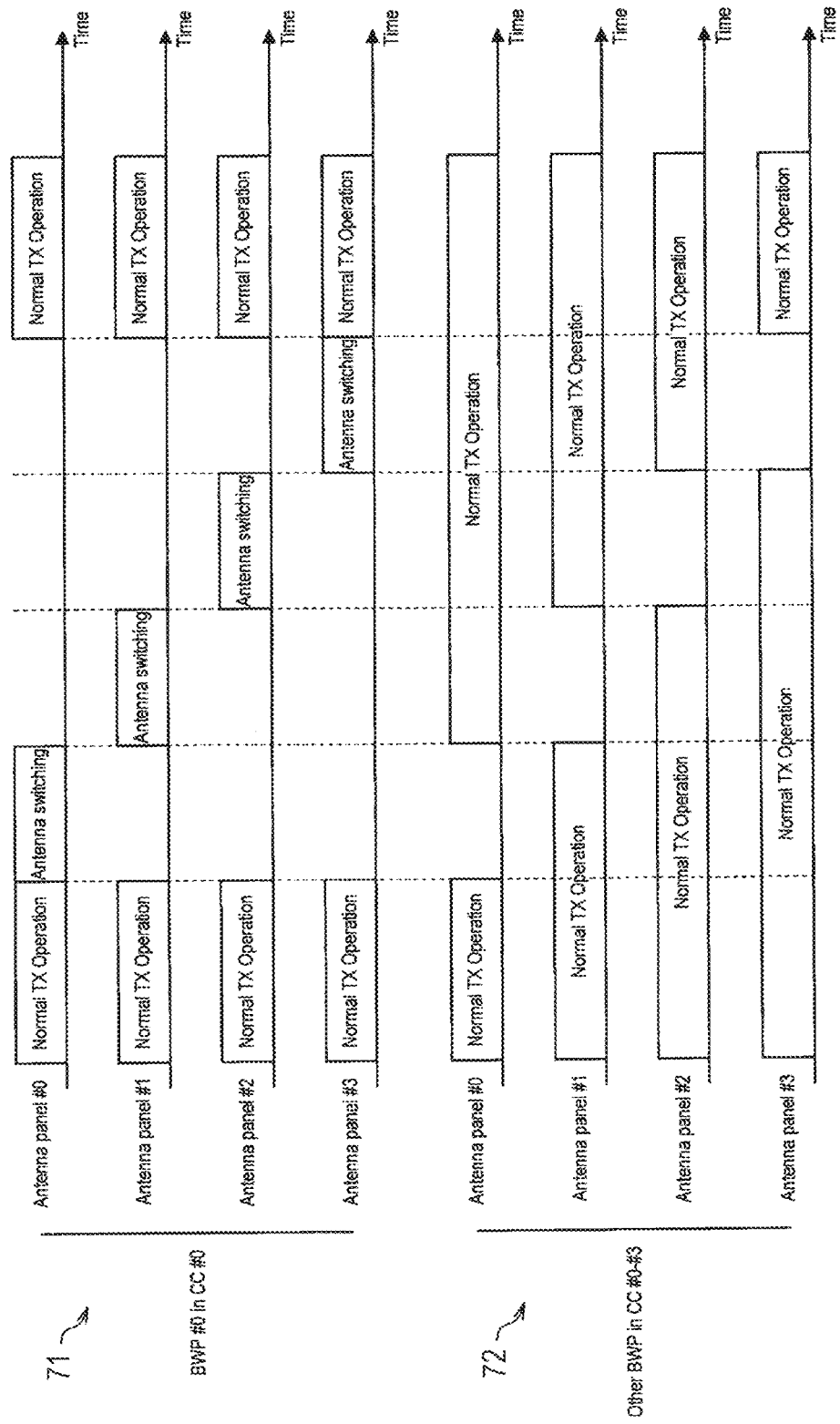
FIG. 13 is a diagram for describing an example of first antenna switching according to the present embodiment.

FIG. 13 is a diagram for describing an example of the first antenna switching according to the present embodiment. The example illustrated in FIG. 13 shows that the first antenna switching is performed by the terminal device 200 including four antenna panels 60 (antenna panels #0 to #3) in an environment where the CCs #0 to #3 exist. It is assumed that the antenna switching is performed on the BWP #0 belonging to the CC #0. At the top 71 of FIG. 13, transmission processing of the antenna panels #0 to #3 on the BWP #0 belonging to the CC #0 is shown. At the bottom 72 of FIG. 13, transmission processing of the antenna panels #0 to #3 on other BWPs (BWPs other than the BWP #0 belonging to the CC #0 and BWPs belonging to the CCs #1 to #3) is shown.

As shown at the top 71 of FIG. 13, the antenna switching is performed by each antenna panel 60 after the normal transmission processing, and then the normal transmission processing is performed again. In each of the antenna panels #0 to #3, the antenna switching is performed in each of different time resources. That is, the frequency resource for the first resource allocated to each antenna panel 60 is the same and the time resource for the first resource allocated to each antenna panel 60 is different.

Further, on the BWP #0 belonging to the CC #0, the antenna panel 60 that does not currently perform the antenna switching does not transmit a signal (that is, does not perform the normal transmission processing) in a time resource in which another antenna panel 60 currently performs the antenna switching. For example, in a time resource in which the antenna panel #0 currently performs the antenna switching on the BWP #0 belonging to the CC #0, the antenna panels #1 to #3 do not transmit a signal on the BWP #0 belonging to the CC #0.

As shown at the bottom 72 of FIG. 13, the antenna panel 60 that currently performs the antenna switching does not transmit a signal on other BWPs. For example, in a time resource in which the antenna panel #0 currently performs the antenna switching on the BWP #0 belonging to the CC #0, the antenna panel #0 does not transmit a signal on other BWPs.

Further, on other BWPs, the antenna panel 60 that does not currently perform the antenna switching performs the normal transmission processing in a time resource in which another antenna panel 60 currently performs the antenna switching. For example, in a time resource in which the antenna panel #0 currently performs the antenna switching on the BWP #0 belonging to the CC #0, the antenna panels #1 to #3 transmit a signal on other BWPs.

As described above, according to the first antenna switching, the antenna panel 60 that currently performs the antenna switching does not perform the normal transmission processing. Therefore, the terminal device 200 can prevent the antenna switching from affecting a signal transmitted by the normal transmission processing.

Further, according to the first antenna switching, the antenna switching in the plurality of antenna panels 60 is performed in different time resources. Then, the antenna panel 60 that does not currently perform the antenna switching performs the normal transmission processing on a BWP other than a BWP on which the antenna switching is currently performed while another antenna panel 60 currently performs the antenna switching. Therefore, even in a case where the normal transmission processing is interrupted in time in each antenna panel 60, the normal transmission processing can be performed without interruption in time as a whole. Therefore, it is desirable that the first antenna switching is adopted especially in communication requiring low delay.

The flow of processing for the first antenna switching will be described with reference to FIG. 14.

Figure 14:
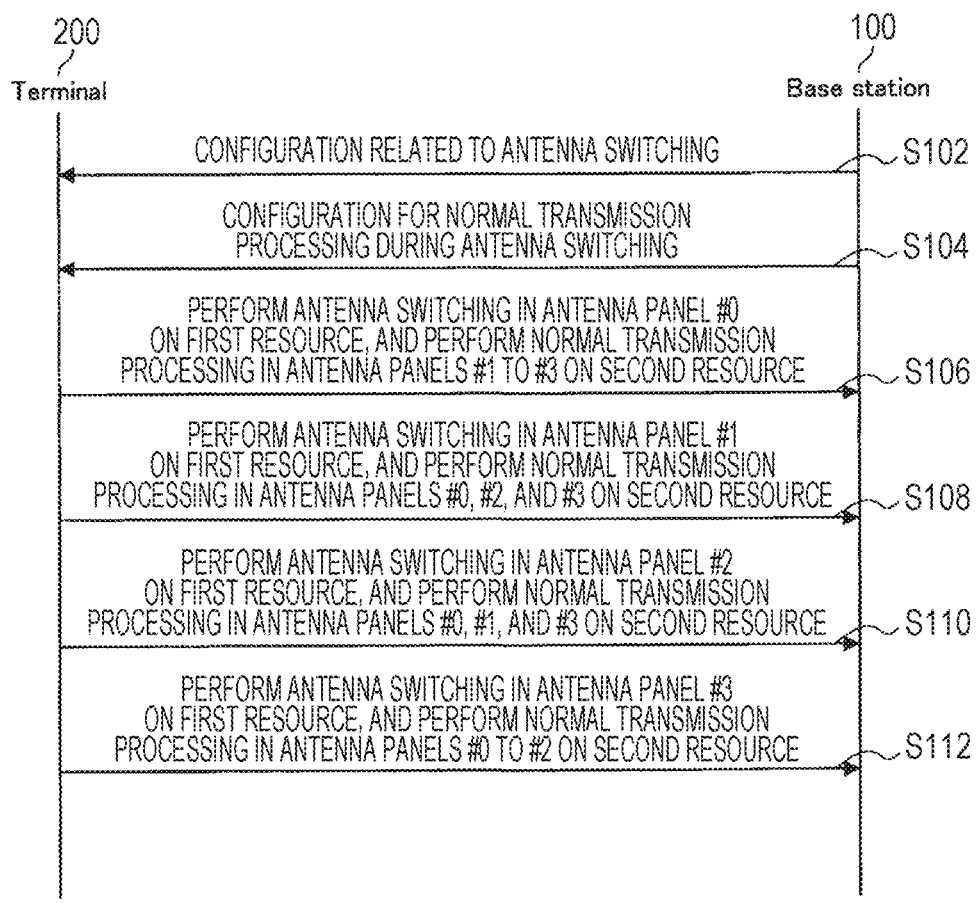
FIG. 14 is a sequence diagram illustrating an example of a flow of first antenna switching processing performed in a system 1 according to the present embodiment.

FIG. 14 is a sequence diagram illustrating an example of a flow of the first antenna switching processing performed in the system 1 according to the present embodiment. As illustrated in FIG. 14, the base station 100 and the terminal device 200 are involved in this sequence. It is assumed that the terminal device 200 includes four antenna panels 60 (antenna panels #0 to #3).

As illustrated in FIG. 14, first, the base station 100 transmits, to the terminal device 200, a configuration related to the antenna switching (Step S102). Such a configuration includes at least indication information indicating an antenna panel 60 in which the antenna switching is to be performed and a first resource on which the antenna switching in the antenna panel 60 is to be performed. Note that the first resource is allocated to each antenna panel 60. Here, the first resource in each of different time resources is allocated to each antenna panel 60.

Next, the base station 100 transmits, to the terminal device 200, a configuration for the normal transmission processing during the antenna switching (Step S104). Such a configuration includes at least indication information indicating the second resource. Note that the second resource is allocated to each antenna panel 60.

Next, the terminal device 200 performs the antenna switching in the antenna panel #0 on the first resource, and performs the normal transmission processing in the antenna panels #1 to #3 on the second resource (Step S106). Then, the terminal device 200 performs the antenna switching in the antenna panel #1 on the first resource, and performs the normal transmission processing in the antenna panels #0, #2, and #3 on the second resource (Step 3108). Then, the terminal device 200 performs the antenna switching in the antenna panel #2 on the first resource, and performs the normal transmission processing in the antenna panels #0, #1, and #3 on the second resource (Step S110). Then, the terminal device 200 performs the antenna switching in the antenna panel #3 on the first resource, and performs the normal transmission processing in the antenna panels #0 to #2 on the second resource (Step S112).

Second Antenna Switching

The second antenna switching is a method in which the antenna switching is performed for each antenna panel in an overlapping time resource. The present method relates to the above-described second proposed technology.

In the present method, the indication information includes information for indicating the antenna switching in each of the plurality of antenna panels 60 to be performed in an overlapping time resource. The overlapping time resource here includes the same time resource and a time resource that is partially the same. The terminal device 200 (for example, the antenna control section 243) performs, on the basis of the corresponding indication information, the antenna switching in each of the plurality of antenna panels 60 in an overlapping time resource. This will be specifically described with reference to FIG. 15.

Figure 15:
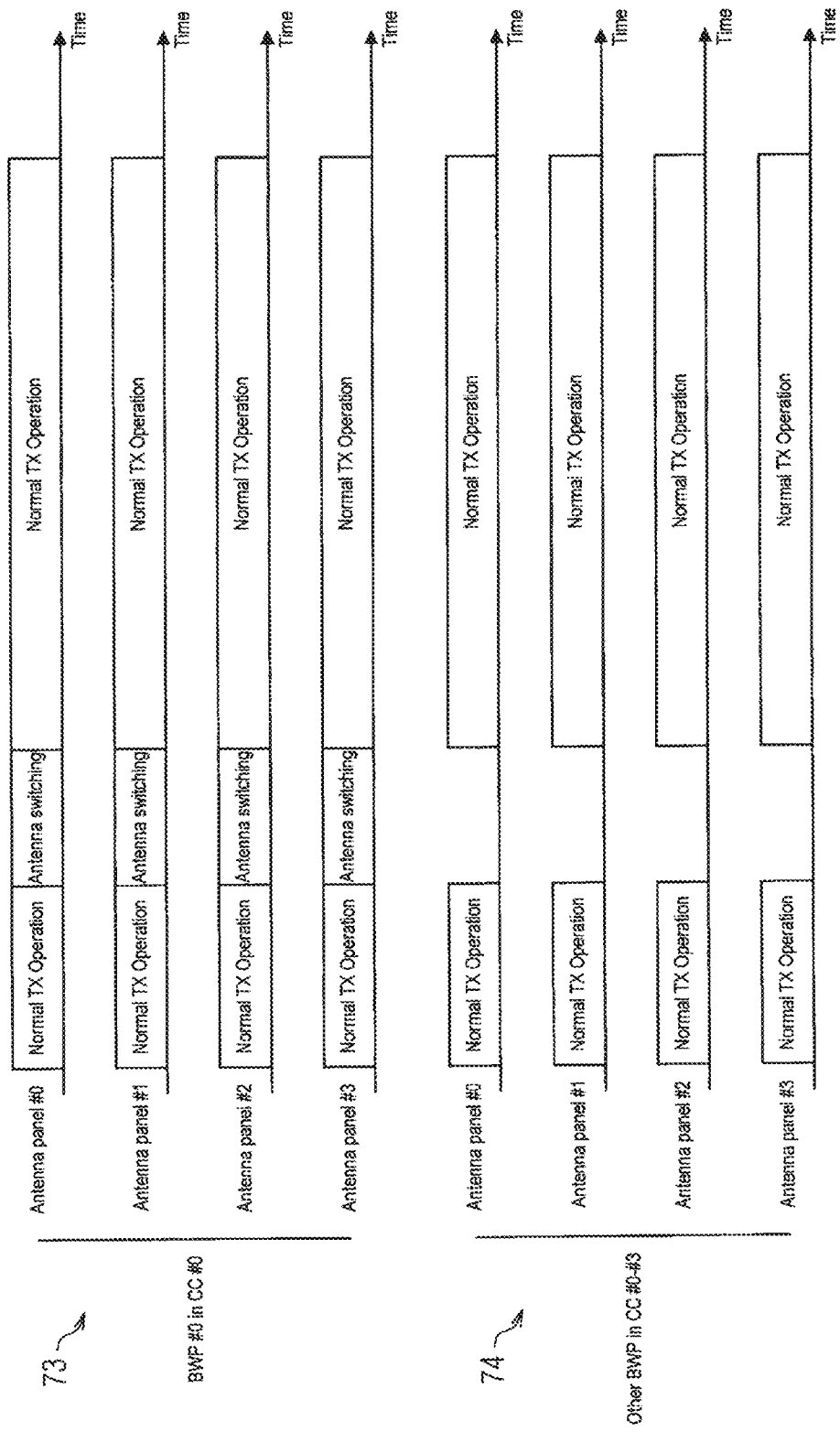
FIG. 15 is a diagram for describing second antenna switching according to the present embodiment.

FIG. 15 is a diagram for describing the second antenna switching according to the present embodiment. The example illustrated in FIG. 15 shows that the second antenna switching is performed by the terminal device 200 including four antenna panels 60 (antenna panels #0 to #3) in an environment where the CCs #0 to #3 exist. It is assumed that the antenna switching is performed on the BWP #0 belonging to the CC #0. At the top 73 of FIG. 15, transmission processing of the antenna panels #0 to #3 on the BWP #0 belonging to the CC #0 is shown. At the bottom 74 of FIG. 15, transmission processing of the antenna panels #0 to #3 on other BWPs (BWPs other than the BWP #0 belonging to the CC #0 and BWPs belonging to the CCs #1 to #3) is shown.

As shown at the top 73 of FIG. 15, the antenna switching is performed by each antenna panel 60 after the normal transmission processing, and then the normal transmission processing is performed again. In each of the antenna panels #0 to #3, the antenna switching is performed in the same time resource. That is, the frequency resource and the time resource for the first resource allocated to each antenna panel 60 are the same.

As shown at the bottom 74 of FIG. 15, the antenna panel 60 that currently performs the antenna switching does not transmit a signal on other BWPs. For example, in a time resource in which the antenna panel #0 currently performs the antenna switching on the BWP #0 belonging to the CC #0, the antenna panel #0 does not transmit a signal on other BWPs.

As described above, according to the second antenna switching, the antenna panel 60 that currently performs the antenna switching does not perform the normal transmission processing. Therefore, the terminal device 200 can prevent the antenna switching from affecting a signal transmitted by the normal transmission processing.

Further, according to the second antenna switching, the antenna switching is performed for each antenna panel in an overlapping time resource. A period during which the antenna switching is performed in any antenna panel is equivalent to one time of antenna switching. Referring back to FIG. 13, in the first antenna switching, a period during which the antenna switching is performed in any antenna panel corresponds to the number of antenna panels 60, that is, is equivalent to four times of antenna switching. As described above, the period during which the antenna switching is performed in any antenna panel in the second antenna switching is greatly reduced, as compared with the first antenna switching. Therefore, in the second antenna switching, it is possible to increase the amount of resources that can be used for the normal transmission processing, thereby improving a throughput.

The flow of processing for the second antenna switching will be described with reference to FIG. 16.

Figure 16:
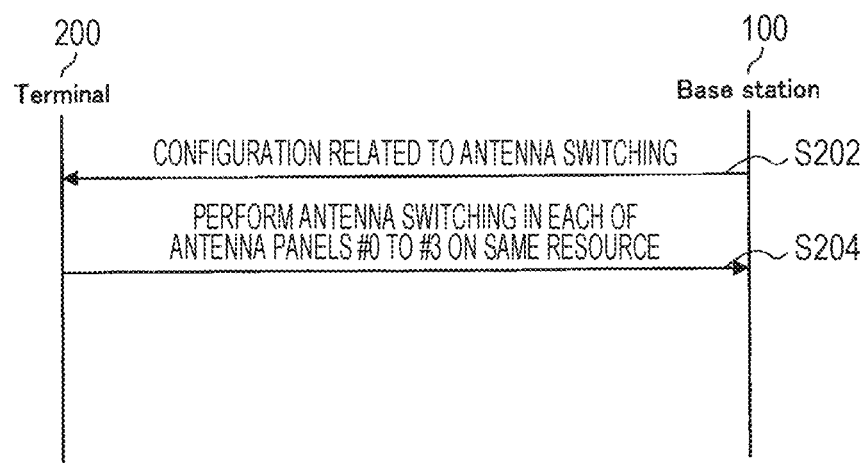
FIG. 16 is a sequence diagram illustrating an example of a flow of second antenna switching processing performed in the system 1 according to the present embodiment.

FIG. 16 is a sequence diagram illustrating an example of a flow of the second antenna switching processing performed in the system 1 according to the present embodiment. As illustrated in FIG. 16, the base station 100 and the terminal device 200 are involved in this sequence. It is assumed that the terminal device 200 includes four antenna panels 60 (antenna panels #0 to #3).

As illustrated in FIG. 16, first, the base station 100 transmits, to the terminal device 200, a configuration related to the antenna switching (Step S202). Such a configuration includes at least indication information indicating an antenna panel 60 in which the antenna switching is to be performed and a first resource on which the antenna switching in the antenna panel 60 is to be performed. Note that the first resource is allocated to each antenna panel 60. Here, the same first resource is allocated to all the antenna panels 60.

Next, the terminal device 200 performs the antenna switching in each of the antenna panels #0 to #3 on the same resource (Step S204).

Supplement

Hereinabove, two antenna switching methods have been described.

As will be described later with respect to the antenna panel configuration information, an antenna configuration of each of the plurality of antenna panels 60 may be different. In this case, the length of a time resource for the antenna switching for each antenna panel 60 can vary. For example, the length of the time resource for the antenna switching is different between a 2T4R antenna panel 60 and a 1T4R antenna panel 60, which will be described later. In this case, it is desirable that a time resource for individual antenna switching is configured in one BWP for each of the antenna panels 60 for which the length of the time resource for the antenna switching is different. In this case, for example, the first antenna switching can be performed.

On the other hand, the length of the time resource for the antenna switching for each antenna panel 60 may be the same due to the same antenna configuration or the like. In this case, it is desirable that a time resource for common antenna switching is configured in one BWP for each of the antenna panels 60 for which the length of the time resource for the antenna switching is same. In this case, the second antenna switching can be performed.

Further, the first antenna switching and the second antenna switching may be combined. For example, the antenna switching of some of the plurality of antenna panels 60 may be performed in different time resources, while the antenna switching of other antenna panels 60 may be performed in a common time resource.

(3) Reporting of Antenna Panel Configuration Information

The terminal device 200 (for example, the reporting section 241) reports the antenna panel configuration information to the base station 100. Such a technology relates to the above-described third proposed technology.

The antenna panel configuration information is information indicating a configuration of each of the plurality of antenna panels 60 included in the terminal device 200. For example, the antenna panel configuration information includes identification information of the antenna panel 60, and information indicating the number of transmission analogue circuits 54 and the number of reception analogue circuits 55 of each antenna panel 60. An example of the antenna panel configuration information is shown in Table 2 below.

TABLE 2

Example of Antenna Panel Configuration Information

| Antenna Panel ID | Antenna Switching Mode |
|---|---|
| 0 | 2T4R |
| 1 | 2T4R |
| 2 | 1T2R |
| 3 | 1T4R |

In Table 2 above, the antenna panel ID is the identification information of the antenna panel 60. The antenna switching mode is information indicating the number of transmission analogue circuits 54 and the number of reception analogue circuits 55. The number in front of "T" indicates the number of transmission analogue circuits 54, and the number in front of "R" indicates the number of reception analogue circuits 55. For example, in a case of 2T4R, the number of transmission analogue circuits 54 is two and the number of reception analogue circuits 55 is four. The antenna panel configuration information may include the number of antennas 51. Note that, in the example shown in Table 2 above, it is assumed that the number of antennas 51 and the number of reception analogue circuits 55 are the same.

Note that the antenna switching mode is information common to all BWPs. Therefore, the terminal device 200 reports, to the base station 100, the antenna panel configuration information as information common to all BWPs.

The base station 100 (for example, the setting section 151) allocates a time resource for the antenna switching to each BWP on the basis of the antenna panel configuration information. This is because a time at which the antenna switching is performed may be different for each BWP.

The base station 100 (for example, the setting section 151) allocates a time resource for the antenna switching to each antenna panel 60 on the basis of the antenna panel configuration information. As the time resource for the antenna switching, time resources for connection of the transmission analogue circuit 54 to the antenna 51 are allocated, the time resources being as many as the number of times of connection. More specifically, time resources for connection of the transmission analogue circuit 54 to the antenna 51 are allocated, the time resources being as many as a value obtained by dividing the number of antennas 51 by the number of transmission analogue circuits 54. For example, in a case where the antenna panel 60 has a configuration of 1T2R/2T4R, two time resources for the antenna switching are allocated. On the other hand, in a case where the antenna panel 60 has a configuration of 1T4R, four time resources for the antenna switching are allocated. Further, a signal for the antenna switching is transmitted in a time resource in which the transmission analogue circuit 54 is connected to the antenna 51. An example of allocation of a time resource to each antenna panel 60 will be described with reference to FIG. 17.

Figure 17:
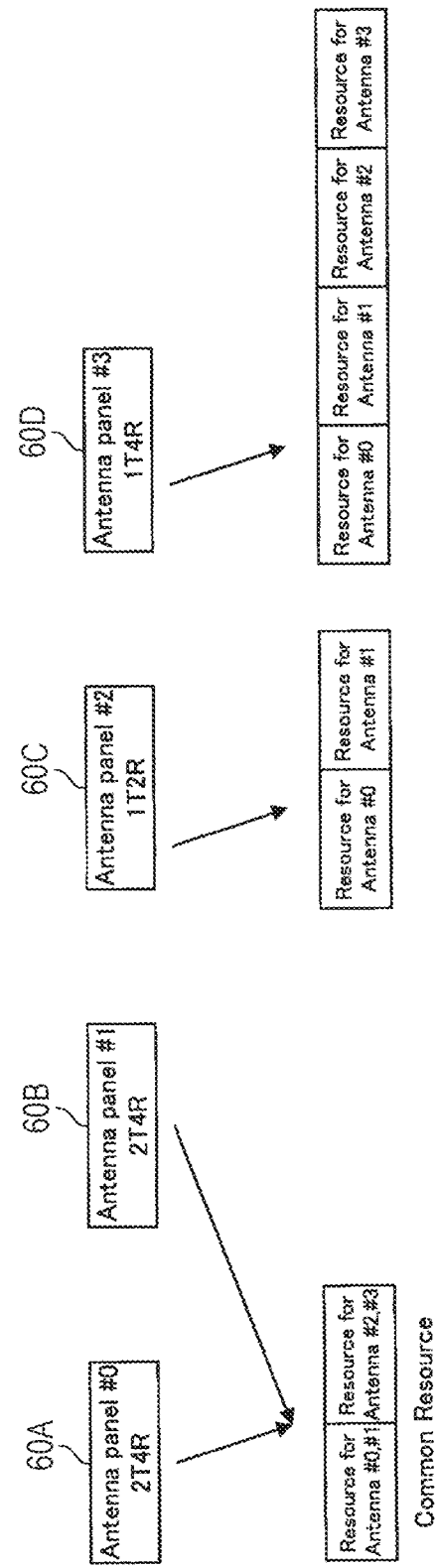
FIG. 17 is a diagram for describing an example of allocation of a time resource to each antenna panel according to the present embodiment.

FIG. 17 is a diagram for describing an example of allocation of a time resource to each antenna panel 60 according to the present embodiment. In the example illustrated in FIG. 17, the antenna switching mode of the antenna panels #0 and #1 (60A and 60B) is 2T4R, in which four antennas 51, the antennas #0 to #3, are included. Therefore, two time resources, a time resource for connection to the antennas #0 and #1 and a time resource for connection to the antennas #2 and #3, are allocated to both of the antenna panels #0 and #1. The antenna switching mode of the antenna panel #2 (60C) is 1T2R, in which two antennas 51 of the antennas #0 and #1 are included. Therefore, two time resources for connection to each of the antennas #0 and #1 are allocated to the antenna panel #2. The antenna switching mode of the antenna panel #3 (60D) is 1T4R, in which four antennas 51 of the antennas #0 to #3 are included. Therefore, four time resources for connection to each of the antennas #0 to #3 are allocated to the antenna panel #3.

As described above, the length of the time resource for the antenna switching varies depending on the configuration of the antenna panel 60. In this regard, the base station 100 can allocate time resources for the antenna switching in just proportions by receiving the report of the antenna panel configuration information.

(4) Reporting of Capability Information

The terminal device 200 (for example, the reporting section 241) reports, to the base station 100, the capability information regarding the antenna switching of each of the plurality of antenna panels 60 included in the terminal device 200. Such a technology relates to the above-described third technical feature.

The capability information can include information indicating whether or not an antenna panel 60 that does not currently perform the antenna switching is capable of transmitting a signal (for example, a data signal) on a frequency resource in a time resource for the first resource on which another antenna panel 60 currently performs the antenna switching, the frequency resource belonging to a CC different from that of the first resource on which another antenna panel 60 currently performs the antenna switching. For example, it is assumed that, in an environment where the CCs #0 to #3 exist, the first antenna panel 60 performs the antenna switching on the BWP #0 in the CC #0. In this case, the capability information includes information indicating whether or not the second antenna panel 60 that does not currently perform the antenna switching can perform the normal transmission processing on the BWPs belonging to the CCs #1 to #3.

The capability information can include information indicating whether or not an antenna panel 60 that does not currently perform the antenna switching is capable of transmitting a signal on a frequency resource in a time resource for the first resource on which another antenna panel 60 currently performs the antenna switching, the frequency resource belonging to the same CC as that of the first resource on which another antenna panel 60 currently performs the antenna switching, and being different from the first resource on which another antenna panel 60 currently performs the antenna switching. For example, it is assumed that, in an environment where the CC #0 includes the BWPs #0 to #3, the first antenna panel 60 performs the antenna switching on the BWP #0 in the CC #0. In this case, the capability information includes information indicating whether or not the second antenna panel 60 that does not currently perform the antenna switching can perform the normal transmission processing on the BWPs #1 to #3 in the CC #0.

In summary, it can also be said that the capability information includes information indicating whether or not an antenna panel 60 that does not currently perform the antenna switching is capable of transmitting a signal on a frequency resource in a time resource for the first resource on which another antenna panel 60 currently performs the antenna switching, the frequency resource being different from the first resource on which another antenna panel 60 currently performs the antenna switching. For example, it is assumed that, in an environment where the CCs #0 to #3 exist, and each CC includes the BWPs #0 to #3, the first antenna panel 60 performs the antenna switching on the BWP #0 in the CC #0. In this case, the capability information includes information indicating whether or not the second antenna panel 60 that does not currently perform the antenna switching can perform the normal transmission processing on the BWPs #1 to #3 belonging to the CC #0 and the BWPs #0 to #3 belonging to the CCs #1 to #3.

By providing the capability information including these information, the base station 100 can recognize the capability of the terminal device 200, in particular, a mode in which the fluctuation of the analogue circuit caused at the time of the antenna switching affects other BWPs. Further, the base station 100 can allocate, in just proportions, resources for the normal transmission processing using the antenna panel 60 that does not currently perform the antenna switching. That is, the base station 100 can cause the terminal device 200 to perform normal transmission processing according to the capability. This will be specifically described with reference to FIG. 18.

Figure 18:
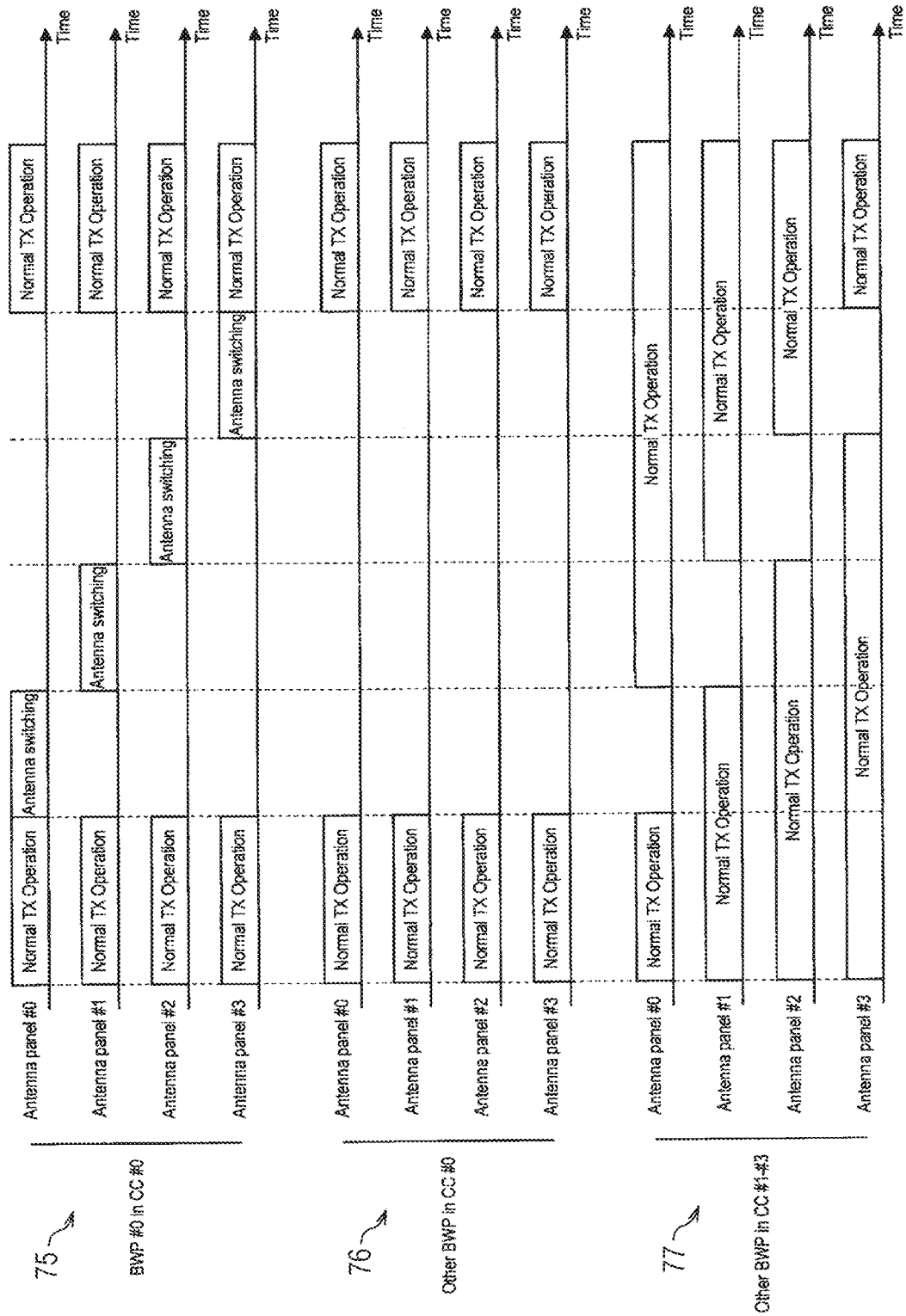
FIG. 18 is a diagram for describing an example of antenna switching according to capability according to the present embodiment.

FIG. 18 is a diagram for describing an example of the antenna switching according to the capability according to the present embodiment. In the example illustrated in FIG. 18, it is assumed that the first antenna switching is performed in a similar manner to that in the example illustrated in FIG. 13. The example illustrated in FIG. 18 shows that the first antenna switching is performed by the terminal device 200 including four antenna panels 60 (antenna panels #0 to #3) in an environment where the CCs #0 to #3 exist. It is assumed that the antenna switching is performed on the BWP #0 belonging to the CC #0. At the top 75 of FIG. 18, transmission processing of the antenna panels #0 to #3 on the BWP #0 belonging to the CC #0 is shown. At the middle 76 of FIG. 18, transmission processing of the antenna panels #0 to #3 on BWPs other than the BWP #0 belonging to the CC #0 is shown. At the bottom 77 of FIG. 18, transmission processing of the antenna panels #0 to #3 on BWPs belonging to the CCs #1 to #3 is shown.

The transmission processing shown at the top 75 of FIG. 18 is similar to the transmission processing shown at the top 71 of FIG. 13. The transmission processing shown at the bottom 77 of FIG. 18 is similar to the transmission processing shown at the bottom 72 of FIG. 13.

Here, it is assumed that the antenna panel 60 that does not currently perform the antenna switching cannot transmit a signal on a frequency resource that belongs to the same CC as that of the first resource and is different from the first resource. Therefore, as shown at the middle 76 of FIG. 18, on a BWP other than the BWP #0 belonging to the CC #0, the antenna panel 60 that does not currently perform the antenna switching does not transmit a signal in a time resource in which another antenna panel 60 currently performs the antenna switching. Therefore, the base station 100 does not have to allocate a resource for the normal transmission processing performed by the antenna panel 60 that does not currently perform the antenna switching on a BWP other than the BWP #0 belonging to the CC #0.

4. Application Example

The technology according to the present disclosure can be applied to various products.

For example, the base station 100 may be realized as any kind of evolved Node B (eNB) such as a macro eNB or a small eNB. The small eNB may be an eNB that covers a cell smaller than a macrocell, such as a pico eNB, a micro eNB, or a home (femto) eNB. Alternatively, the base station 100 may be realized as another type of base station such as a NodeB or a base transceiver station (BTS). The base station 100 may include a main body (also referred to as a base station device) that controls wireless communication, and one or more remote radio heads (RRHs) that are arranged at a location different from that of the main body. Further, various types of terminals as described later may be operated as the base station 100 by temporarily or semi-permanently executing the base station function.

Further, for example, the terminal device 200 may be implemented as a smartphone, a tablet personal computer (PC), a notebook PC, a portable game terminal, a mobile terminal such as a portable/dongle type mobile router, a digital camera, or the like, or an in-vehicle terminal such as a car navigation device. Further, the terminal device 200 may be realized as a terminal (also referred to as a machine type communication (MTC) terminal) that performs machine to machine (M2M) communication. Moreover, the terminal device 200 may be a wireless communication module (for example, an integrated circuit module configured with one die) mounted on these terminals.

<4.1. Application Example Related to Base Station>
(First Application Example)

Figure 19:
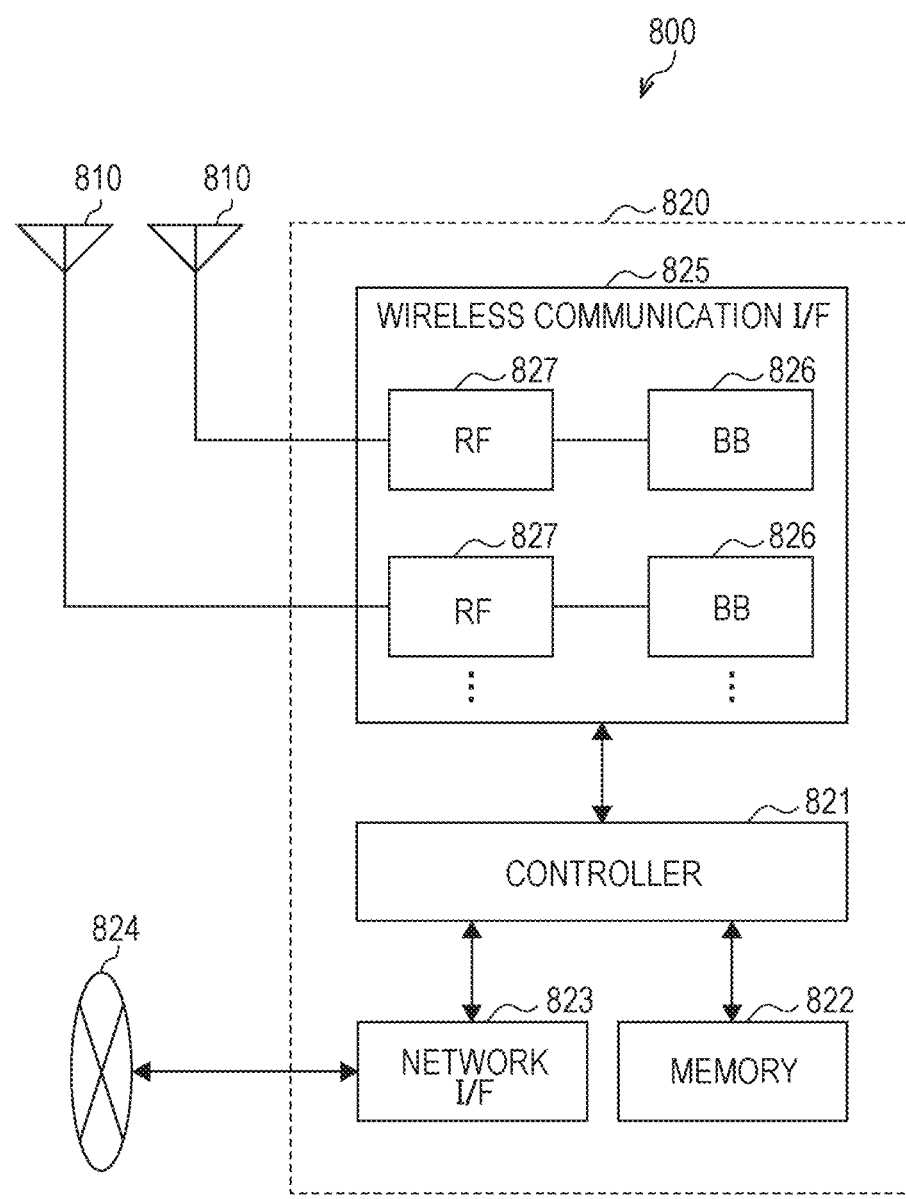
FIG. 19 is a block diagram illustrating a first example of a schematic configuration of an eNB.

FIG. 19 is a block diagram illustrating a first example of a schematic configuration of an eNB to which the technology according to the present disclosure can be applied. An eNB 800 includes one or more antennas 810 and a base station device 820. Each antenna 810 and the base station device 820 can be connected to each other via an RF cable.

Each of the antennas 810 includes a single or multiple antenna elements (for example, a plurality of antenna elements constituting a MIMO antenna) and is used for transmission and reception of a wireless signal by the base station device 820. The eNB 800 includes a plurality of antennas 810 as illustrated in FIG. 19, and the plurality of antennas 810 may correspond to, for example, a plurality of frequency bands used by the eNB 800, respectively. Note that although FIG. 19 illustrates an example in which the eNB 800 includes a plurality of antennas 810, the eNB 800 may include a single antenna 810.

The base station device 820 includes a controller 821, a memory 822, a network interface 823, and a wireless communication interface 825.

The controller 821 may be, for example, a central processing unit (CPU) or a digital signal processor (DSP), and perform a control to operate various functions of the upper layer of the base station device 820. For example, the controller 821 generates a data packet from data in a signal processed by the wireless communication interface 825 and forwards the generated packet via the network interface 823. The controller 821 may generate a bundled packet by bundling data from a plurality of baseband processors and forward the generated bundled packet. In addition, the controller 821 may have logical functions of performing a control such as a radio resource control, a radio bearer control, mobility management, an admission control, scheduling, or the like. Further, the control may be performed in cooperation with the surrounding eNB or the core network node. The memory 822 includes a random access memory (RAM) and a read only memory (ROM), and stores a program executed by the controller 821 and various control data (for example, a terminal list, transmission power data, scheduling data, and the like).

The network interface 823 is a communication interface for connecting the base station device 820 to a core network 824. The controller 821 may perform communication with a core network node or another eNB via the network interface 823. In that case, the eNB 800, and the core network node or another eNB may be connected to each other by a logical interface (for example, an S1 interface or X2 interface). The network interface 823 may be a wired communication interface or a wireless communication interface for a wireless backhaul. In a case where the network interface 823 is a wireless communication interface, the network interface 823 may use, for wireless communication, a frequency band higher than a frequency band used by the wireless communication interface 825.

The wireless communication interface 825 supports any one of cellular communication schemes such as long term evolution (LTE), LTE-Advanced, or the like, and provides wireless connection to a terminal located in a cell of the eNB 800 via the antenna 810. The wireless communication interface 825 may typically include a baseband (BB) processor 826, an RF circuit 827, and the like. The BB processor 826 may perform, for example, encoding/decoding, modulation/demodulation, multiplexing/demultiplexing, and the like, and may perform various signal processing of each layer (for example, L1, medium access control (MAC), radio link control (RLC), and packet data convergence protocol (PDCP)). Instead of the controller 821, the BB processor 826 may have some or all of the above-described logical functions. The BB processor 826 may be a module including a memory that stores a communication control program, a processor that executes the program, and a related circuit, and the functions of the BB processor 826 may be changed by updating the above-described program. Further, the above-described module may be a card or a blade to be inserted into a slot of the base station device 820, or may be a chip mounted on the card or the blade. Meanwhile, the RF circuit 827 may include a mixer, a filter, an amplifier, and the like, and transmits and receives a wireless signal via the antenna 810.

The wireless communication interface 825 includes a plurality of BB processors 826 as illustrated in FIG. 19, and the plurality of BB processors 826 may correspond to, for example, a plurality of frequency bands used by the eNB 800, respectively. Further, the wireless communication interface 825 includes a plurality of RF circuits 827 as illustrated in FIG. 19, and the plurality of RF circuits 827 may correspond to, for example, a plurality of antenna elements, respectively. Note that although FIG. 19 illustrates an example in which the wireless communication interface 825 includes a plurality of BB processors 826 and a plurality of RF circuits 827, the wireless communication interface 825 may include a single BB processor 826 or a single RF circuit 827.

In the eNB 800 illustrated in FIG. 19, one or more constituent elements (for example, the setting section 151 and/or the measurement section 153) included in the control section 150 described with reference to FIG. 10 may be implemented in the wireless communication interface 825. Alternatively, at least some of these constituent elements may be implemented in the controller 821. As an example, the eNB 800 may be mounted with a module including a part (for example, the BB processor 826) of or the entire wireless communication interface 825 and/or the controller 821, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the eNB 800, and the wireless communication interface 825 (for example, the BB processor 826) and/or the controller 821 may execute the program. As described above, the eNB 800, the base station device 820, or the above-described module may be provided as a device including the one or more constituent elements described above, and a program for causing a processor to function as the one or more constituent elements described above may be provided. Further, a readable recording medium on which the above-described program is recorded may be provided.

Further, in the eNB 800 illustrated in FIG. 19, the wireless communication section 120 described with reference to FIG. 10 may be implemented in the wireless communication interface 825 (for example, the RF circuit 827). Further, the antenna section 110 may be implemented in the antenna 810. Further, the network communication section 130 may be implemented in the controller 821 and/or the network interface 823. Further, the storage section 140 may be implemented in the memory 822.

(Second Application Example)

Figure 20:
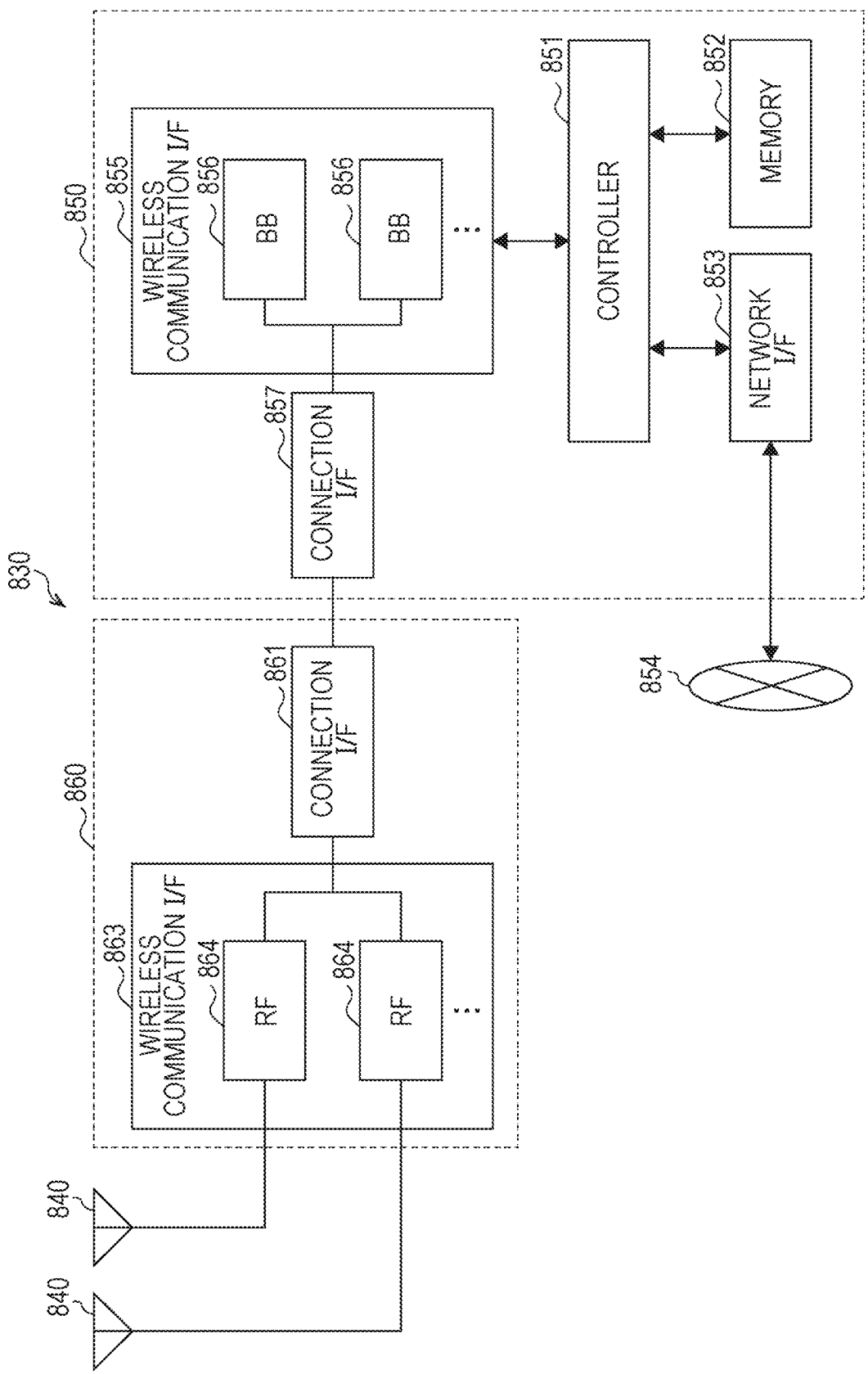
FIG. 20 is a block diagram illustrating a second example of the schematic configuration of the eNB.

FIG. 20 is a block diagram illustrating a second example of a schematic configuration of an eNB to which the technology according to the present disclosure can be applied. An eNB 830 includes one or more antennas 840, a base station device 850, and an RRH 860. Each antenna 840 and the RRH 860 may be connected to each other via an RF cable. Further, the base station device 850 and the RRH 860 can be connected to each other by a high-speed line such as an optical fiber cable.

Each of the antennas 840 includes a single or multiple antenna elements (for example, a plurality of antenna elements constituting a MIMO antenna) and is used for transmission and reception of a wireless signal by the RRH 860.

The eNB 830 includes a plurality of antennas 840 as illustrated in FIG. 20, and the plurality of antennas 840 may correspond to, for example, a plurality of frequency bands used by the eNB 830, respectively. Note that although FIG. 20 illustrates an example in which the eNB 830 includes a plurality of antennas 840, the eNB 830 may include a single antenna 840.

The base station device 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 19.

The wireless communication interface 855 supports any one of cellular communication schemes such as LTE, LTE-Advanced, or the like, and provides wireless connection to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 19, except that the BB processor 856 is connected to an RF circuit 864 of the RRH 860 via the connection interface 857. The wireless communication interface 855 includes a plurality of BB processors 856 as illustrated in FIG. 20, and the plurality of BB processors 856 may correspond to, for example, a plurality of frequency bands used by the eNB 830, respectively. Note that although FIG. 20 illustrates an example in which the wireless communication interface 855 includes a plurality of BB processors 856, the wireless communication interface 855 may include a single BB processor 856.

The connection interface 857 is an interface for connecting the base station device 850 (wireless communication interface 855) to the RRH 860. The connection interface 857 may be a communication module for communication on the above-described high-speed line connecting the base station device 850 (wireless communication interface 855) and the RRH 860 to each other.

Further, the RRH 860 includes a connection interface 861 and a wireless communication interface 863.

The connection interface 861 is an interface for connecting the RRH 860 (wireless communication interface 863) to the base station device 850. The connection interface 861 may be a communication module for communication on the above-described high-speed line.

The wireless communication interface 863 transmits and receives a wireless signal via the antenna 840. The wireless communication interface 863 may typically include an RF circuit 864 and the like. The RF circuit 864 may include a mixer, a filter, an amplifier, and the like, and transmits and receives a wireless signal via the antenna 840. The wireless communication interface 863 includes a plurality of RF circuits 864 as illustrated in FIG. 20, and the plurality of RF circuits 864 may correspond to, for example, a plurality of antenna elements, respectively. Note that although FIG. 20 illustrates an example in which the wireless communication interface 863 includes a plurality of RF circuits 864, the wireless communication interface 863 may include a single RF circuit 864.

In the eNB 830 illustrated in FIG. 20, one or more constituent elements (for example, the setting section 151 and/or the measurement section 153) included in the control section 150 described with reference to FIG. 10 may be implemented in the wireless communication interface 855 and/or the wireless communication interface 863. Alternatively, at least some of these constituent elements may be implemented in the controller 851. As an example, the eNB 830 may be mounted with a module including a part (for example, the BB processor 856) of or the entire wireless communication interface 855 and/or the controller 851, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the eNB 830, and the wireless communication interface 855 (for example, the BB processor 856) and/or the controller 851 may execute the program. As described above, the eNB 830, the base station device 850, or the above-described module may be provided as a device including the one or more constituent elements described above, and a program for causing a processor to function as the one or more constituent elements described above may be provided. Further, a readable recording medium on which the above-described program is recorded may be provided.

Further, in the eNB 830 illustrated in FIG. 20, for example, the wireless communication section 120 described with reference to FIG. 10 may be implemented in the wireless communication interface 863 (for example, the RF circuit 864). Further, the antenna section 110 may be implemented in the antenna 840. Further, the network communication section 130 may be implemented in the controller 851 and/or the network interface 853.

Further, the storage section 140 may be implemented in the memory 852.

<4.2. Application Example Related to Terminal Device>
(First Application Example)

Figure 21:
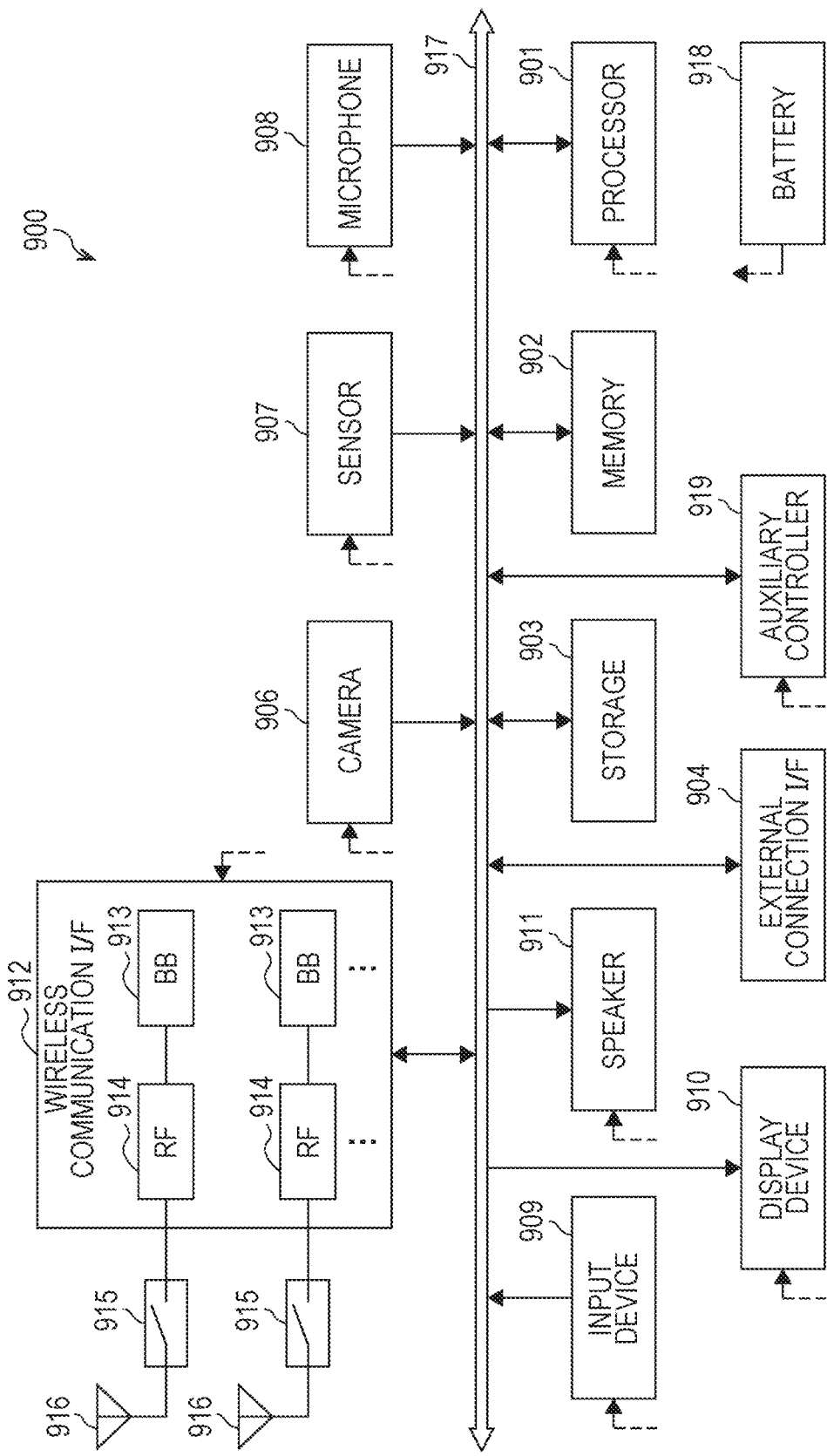
FIG. 21 is a block diagram illustrating an example of a schematic configuration of a smartphone.

FIG. 21 is a block diagram illustrating an example of a schematic configuration of a smartphone 900 to which the technology according to the present disclosure can be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls functions of an application layer and other layers of the smartphone 900. The memory 902 includes a RAM and a ROM and stores a program executed by the processor 901 and data. The storage 903 can include a storage medium such as a semiconductor memory or a hard disk. The external connection interface 904 is an interface for connecting an externally attached device such as a memory card, a universal serial bus (USB) device, or the like to the smartphone 900.

The camera 906 includes, for example, an image capturing element such as a charge coupled device (CCD), a complementary metal oxide semiconductor (CMOS), or the like, and generates a captured image. The sensor 907 can include, for example, a group of sensors such as a positioning sensor, a gyro sensor, a geomagnetic sensor, an acceleration sensor, and the like. The microphone 908 converts sound input to the smartphone 900 into a sound signal. The input device 909 includes, for example, a touch sensor that detects a touch on a screen of the display device 910, a keypad, a keyboard, a button, a switch, or the like, and receives a manipulation or information input from the user. The display device 910 includes a screen such as a liquid crystal display (LCD), an organic light emitting diode (OLED) display, or the like, and displays an output image of the smartphone 900. The speaker 911 converts the sound signal output from the smartphone 900 into sound.

The wireless communication interface 912 supports any cellular communication scheme such as LTE or LTE-Advanced and performs wireless communication. The wireless communication interface 912 can typically include a BB processor 913, an RF circuit 914, and the like. The BB processor 913 may perform, for example, encoding/decoding, modulation/demodulation, multiplexing/demultiplexing, and the like, and performs various signal processing for wireless communication. Meanwhile, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 21. Note that although FIG. 21 illustrates an example in which the wireless communication interface 912 includes a plurality of BB processors 913 and a plurality of RF circuits 914, the wireless communication interface 912 may include a single BB processor 913 or a single RF circuit 914.

Moreover, the wireless communication interface 912 may support another type of wireless communication scheme such as a short-range wireless communication scheme, a near field wireless communication scheme, a wireless local area network (LAN) scheme, or the like, in addition to the cellular communication scheme. In that case, the wireless communication interface 912 may include the BB processor 913 and the RF circuit 914 for each wireless communication scheme.

Each of the antenna switches 915 switches a connection destination of the antenna 916 between a plurality of circuits (for example, circuits for different wireless communication schemes) included in the wireless communication interface 912.

Each of the antennas 916 includes a single or multiple antenna elements (for example, a plurality of antenna elements constituting a MIMO antenna) and is used for transmission and reception of a wireless signal by the wireless communication interface 912. The smartphone 900 may include a plurality of antennas 916 as illustrated in FIG. 21. Note that although FIG. 21 illustrates an example in which the smartphone 900 includes a plurality of antennas 916, the smartphone 900 may include a single antenna 916.

Moreover, the smartphone 900 may include the antenna 916 for each wireless communication scheme. In that case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to one another. The battery 918 supplies power to each block of the smartphone 900 illustrated in FIG. 21 via a power supply line partially indicated by the broken line in FIG. 21. The auxiliary controller 919 performs control to operate minimum necessary functions of the smartphone 900, for example, in a sleep mode.

In the smartphone 900 illustrated in FIG. 21, one or more constituent elements (for example, the reporting section 241 and/or the antenna control section 243) included in the control section 240 described with reference to FIG. 11 may be implemented in the wireless communication interface 912. Alternatively, at least some of these constituent elements may be implemented in the processor 901 or the auxiliary controller 919. As an example, the smartphone 900 may be mounted with a module including a part (for example, the BB processor 913) of or the entire wireless communication interface 912, the processor 901, and/or the auxiliary controller 919, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the smartphone 900, and the wireless communication interface 912 (for example, the BB processor 913), the processor 901, and/or the auxiliary controller 919 may execute the program. As described above, the smartphone 900 or the above-described module may be provided as a device including the one or more constituent elements described above, and a program for causing a processor to function as the one or more constituent elements described above may be provided. Further, a readable recording medium on which the above-described program is recorded may be provided.

Further, in the smartphone 900 illustrated in FIG. 21, for example, the wireless communication section 220 described with reference to FIG. 11 may be implemented in the wireless communication interface 912 (for example, the RF circuit 914). Further, the antenna section 210 may be implemented in the antenna 916. Further, the storage section 230 may be implemented in the memory 902.

(Second Application Example)

Figure 22:
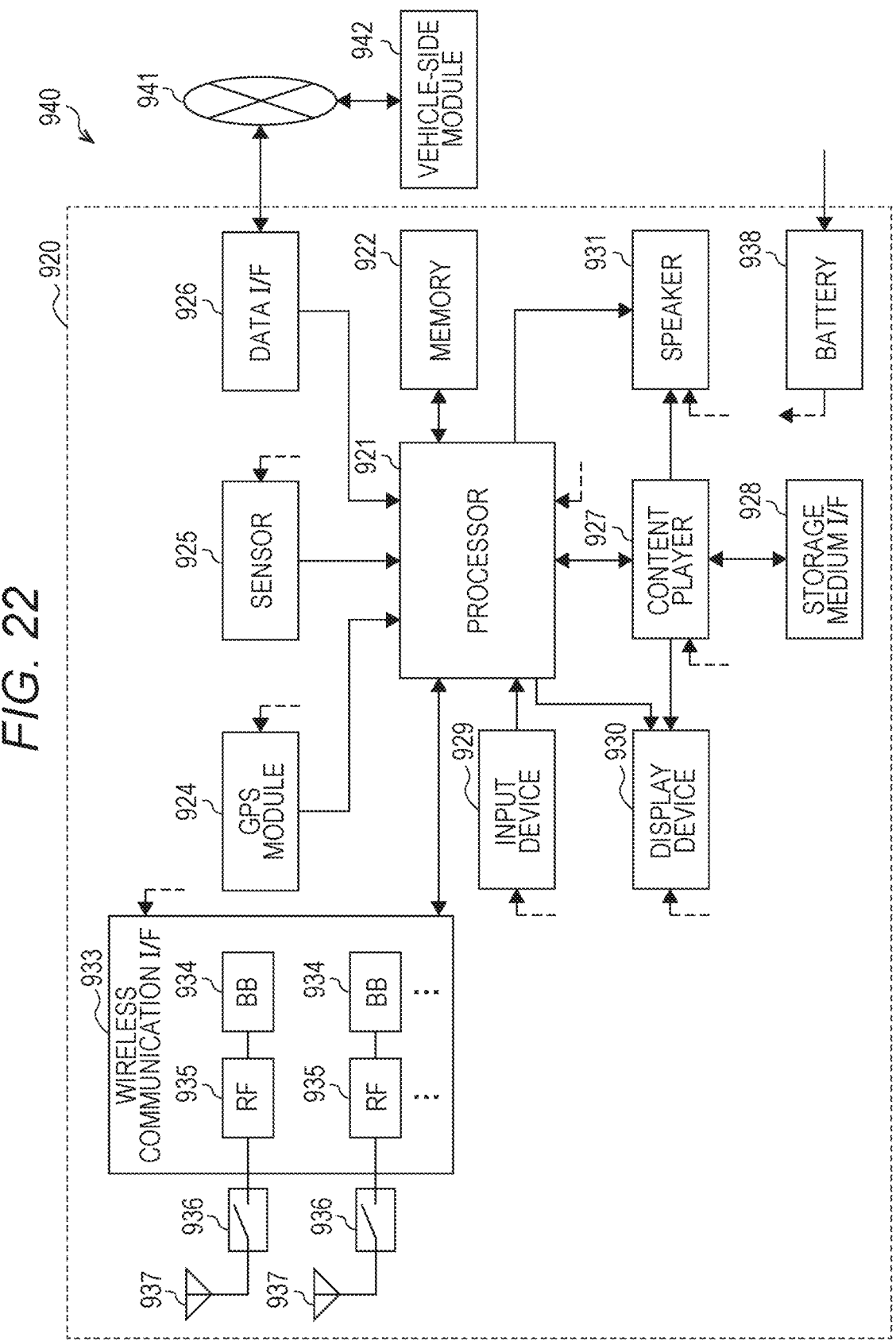
FIG. 22 is a block diagram illustrating an example of a schematic configuration of a car navigation device.

FIG. 22 is a block diagram illustrating an example of a schematic configuration of a car navigation device 920 to which the technology according to the present disclosure can be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls a navigation function and other functions of the car navigation device 920. The memory 922 includes a RAM and a ROM and stores a program executed by the processor 921 and data.

The GPS module 924 uses a GPS signal received from a GPS satellite to measure a location (for example, latitude, longitude, and altitude) of the car navigation device 920. The sensor 925 can include, for example, a group of sensors such as a gyro sensor, a geomagnetic sensor, an atmospheric pressure sensor, and the like. The data interface 926 is connected to an in-vehicle network 941 via a terminal (not illustrated), for example, and acquires data generated in a vehicle side, such as vehicle speed data or the like.

The content player 927 plays a content stored in a storage medium (for example, a CD or a DVD) to be inserted into the storage medium interface 928. The input device 929 includes, for example, a touch sensor that detects a touch on a screen of the display device 930, a button, a switch, or the like, and receives a manipulation or information input from the user. The display device 930 includes a screen such as an LCD, an OLED display, or the like and displays the navigation function or an image of a content to be played. The speaker 931 outputs sound of the navigation function or a content to be played.

The wireless communication interface 933 supports any cellular communication scheme such as LTE or LTE-Advanced and performs wireless communication. The wireless communication interface 933 can typically include a BB processor 934, an RF circuit 935, and the like. The BB processor 934 may perform, for example, encoding/decoding, modulation/demodulation, multiplexing/demultiplexing, and the like, and performs various signal processing for wireless communication. Meanwhile, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 22. Note that although FIG. 22 illustrates an example in which the wireless communication interface 933 includes a plurality of BB processors 934 and a plurality of RF circuits 935, the wireless communication interface 933 may include a single BB processor 934 or a single RF circuit 935.

Moreover, the wireless communication interface 933 may support another type of wireless communication scheme such as a short-range wireless communication scheme, a near field wireless communication scheme, a wireless LAN scheme, or the like, in addition to the cellular communication scheme. In that case, the wireless communication interface 933 may include the BB processor 934 and the RF circuit 935 for each wireless communication scheme.

Each of the antenna switches 936 switches a connection destination of the antenna 937 between a plurality of circuits (for example, circuits for different wireless communication schemes) included in the wireless communication interface 933.

Each of the antennas 937 includes a single or multiple antenna elements (for example, a plurality of antenna elements constituting a MIMO antenna) and is used for transmission and reception of a wireless signal by the wireless communication interface 933. The car navigation device 920 may include a plurality of antennas 937 as illustrated in FIG. 22. Note that although FIG. 22 illustrates an example in which the car navigation device 920 includes a plurality of antennas 937, the car navigation device 920 may include a single antenna 937.

Moreover, the car navigation device 920 may include the antenna 937 for each wireless communication scheme. In that case, the antenna switch 936 may be omitted from the configuration of the car navigation device 920.

The battery 938 supplies power to each block of the car navigation device 920 illustrated in FIG. 22 via a power supply line partially indicated by the broken line in FIG. 22. In addition, the battery 938 accumulates power supplied from the vehicle side.

In the car navigation device 920 illustrated in FIG. 22, one or more constituent elements (for example, the reporting section 241 and/or the antenna control section 243) included in the control section 240 described with reference to FIG. 11 may be implemented in the wireless communication interface 933. Alternatively, at least some of these constituent elements may be implemented in the processor 921. As an example, the car navigation device 920 may be mounted with a module including a part (for example, the BB processor 934) of or the entire wireless communication interface 933 and/or the processor 921, and the one or more constituent elements described above may be implemented in the module. In this case, the above-described module may store a program for causing a processor to function as the one or more constituent elements described above (in other words, a program for causing a processor to perform an operation of the one or more constituent elements described above), and execute the program. As another example, a program for causing a processor to function as the one or more constituent elements described above may be installed in the car navigation device 920, and the wireless communication interface 933 (for example, the BB processor 934) and/or the processor 921 may execute the program. As described above, the car navigation device 920 or the above-described module may be provided as a device including the one or more constituent elements described above, and a program for causing a processor to function as the one or more constituent elements described above may be provided. Further, a readable recording medium on which the above-described program is recorded may be provided.

Further, in the car navigation device 920 illustrated in FIG. 22, for example, the wireless communication section 220 described with reference to FIG. 11 may be implemented in the wireless communication interface 933 (for example, the RF circuit 935). Further, the antenna section 210 may be implemented in the antenna 937. Further, the storage section 230 may be implemented in the memory 922.

Further, the technology according to the present disclosure may be realized as an in-vehicle system (or vehicle) 940 including one or more blocks of the car navigation device 920 described above, the in-vehicle network 941, and a vehicle-side module 942. The vehicle-side module 942 generates vehicle-side data such as a vehicle speed, an engine RPM, failure information, and the like and outputs the generated data to the in-vehicle network 941.

5. Conclusion

Hereinabove, an embodiment of the present disclosure has been described in detail with reference to FIGS. 1 to 22. As described above, the terminal device 200 according to the present embodiment includes a plurality of antenna panels including one or more antennas, one or more transmission analogue circuits, and one or more reception analogue circuits. Further, the terminal device 200 controls, on the basis of indication from the base station, an antenna panel in which antenna switching for switching of connection between an antenna and a transmission analogue circuit is to be performed, among the plurality of antenna panels, and the first resource on which the antenna switching in the corresponding antenna panel is to be performed. As a plurality of antenna panels is provided, the terminal device 200 can perform the normal transmission processing in an antenna panel other than the antenna panel that currently performs the antenna switching, and can improve a throughput. Furthermore, for example, by performing the first antenna switching described above, even in a case where the normal transmission processing is interrupted in time in each antenna panel 60, the terminal device 200 can perform the normal transmission processing without interruption in time as a whole. Further, by performing the second antenna switching described above, the terminal device 200 can perform the antenna switching in each antenna panel with a smaller amount of resources. In this way, the antenna switching can be performed more appropriately.

Hereinabove, the preferred embodiment of the present disclosure has been described in detail with reference to the accompanying drawings, but the technical scope of the present disclosure is not limited to such examples. It is obvious that those having ordinary knowledge in the technical field of the present disclosure can conceive of various modifications or alterations within the scope of the technical idea described in the claims, and it is understood that the modifications or alterations naturally fall within the technical scope of the present disclosure.

For example, in the above-described embodiment, the antenna switching on each BWP has been mainly described, but the present technology is not limited to such an example. For example, the antenna switching may be performed on each CC. For example, the first resource and the second resource may be configured in a unit of CC. A BWP in the description of the above-described embodiment may also be read as a CC.

In addition, the processing described in the present specification using the flowchart and the sequence diagram does not necessarily have to be performed in the illustrated order. Some processing steps may be performed in parallel. Further, additional processing steps may be adopted, and some processing steps may be omitted.

Furthermore, the effects described in the present specification are merely illustrative or exemplary, and not limiting. That is, the technology according to the present disclosure may achieve other effects apparent to those skilled in the art from the description of the present specification, in addition to or instead of the effects described above.

Note that the following configurations also fall within the technical scope of the present disclosure.

(1)

A communication device including:

a plurality of antenna panels that each includes one or more antennas, one or more transmission analogue circuits for transmitting a signal by using the antenna, and one or more reception analogue circuits for receiving a signal by using the antenna; and a control section that controls, on the basis of indication from a base station, the antenna panel in which antenna switching for switching of connection between the antenna and the transmission analogue circuit is to be performed among a plurality of antenna panels, and a first resource on which the antenna switching in the corresponding antenna panel is to be performed.

(2)

The communication device according to (1), in which the indication from the base station includes information that designates a second resource on which signal transmission using the antenna panel that does not currently perform the antenna switching is to be performed in a time resource for the first resource on which another antenna panel among the plurality of antenna panels currently performs the antenna switching.

(3)

The communication device according to (2), in which the second resource is a frequency resource different from the first resource on which the another antenna panel currently performs the antenna switching.

(4)

The communication device according to (3), in which the second resource includes a frequency resource that belongs to a component carrier different from that of the first resource on which the another antenna panel currently performs the antenna switching.

(5)
The communication device according to (3) or (4), in which the second resource includes a frequency resource that belongs to the same component carrier as that of the first resource on which the another antenna panel currently performs the antenna switching, and that is different from the first resource on which the another antenna panel currently performs the antenna switching.

(6)
The communication device according to any one of (2) to (5), in which the indication from the base station includes transmission permission for a signal to be transmitted by using the antenna panel that does not currently perform the antenna switching among the plurality of antenna panels.

(7)
The communication device according to any one of (1) to (6), in which the indication from the base station includes information for indicating the antenna switching in the plurality of antenna panels to be performed in different time resources.

(8)
The communication device according to any one of (1) to (7), in which the indication from the base station includes information for indicating the antenna switching in the plurality of antenna panels to be performed in an overlapping time resource.

(9)
The communication device according to any one of (1) to (8), in which the control section reports, to the base station, information indicating a configuration of each of the plurality of antenna panels.

(10)
The communication device according to any one of (1) to (9), in which the control section reports, to the base station, capability information regarding the antenna switching of each of the plurality of antenna panels.

(11)
The communication device according to (10), in which the capability information includes information indicating whether or not the antenna panel that does not currently perform the antenna switching is capable of transmitting a signal on a frequency resource in a time resource for the first resource on which the another antenna panel currently performs the antenna switching, the frequency resource being different from the first resource on which the another antenna panel currently performs the antenna switching.

(12)
The communication device according to (11), in which the capability information includes information indicating whether or not the antenna panel that does not currently perform the antenna switching is capable of transmitting a signal on a frequency resource in the time resource for the first resource on which the another antenna panel currently performs the antenna switching, the frequency resource belonging to the same component carrier as that of the first resource on which the another antenna panel currently performs the antenna switching, and being different from the first resource on which the another antenna panel currently performs the antenna switching.

(13)
A communication device including:
a control section that indicates, to the communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among the plurality of antenna panels, and a first resource on which the antenna switching is to be performed.

(14)
A communication control method of a communication device, in which the communication device includes a plurality of antenna panels that each includes one or more antennas, one or more transmission analogue circuits for transmitting a signal by using the antenna, and one or more reception analogue circuits for receiving a signal by using the antenna, and
the communication control method includes:
controlling, by a processor, on the basis of indication from a base station, the antenna panel in which antenna switching for switching of connection between the antenna and the transmission analogue circuit is to be performed among the plurality of antenna panels, and a first resource on which the antenna switching in the corresponding antenna panel is to be performed.

(15)
A communication control method including:
indicating, by a processor, to a communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among the plurality of antenna panels, and a first resource on which the antenna switching is to be performed.

(16)
A recording medium in which a program for causing a computer to function as a control section is recorded, the computer controlling a communication device including a plurality of antenna panels that each includes one or more antennas, one or more transmission analogue circuits for transmitting a signal by using the antenna, and one or more reception analogue circuits for receiving a signal by using the antenna, and the control section controlling, on the basis of indication from a base station, the antenna panel in which antenna switching for switching of connection between the antenna and the transmission analogue circuit is to be performed among the plurality of antenna panels, and a first resource on which the antenna switching in the corresponding antenna panel is to be performed.

(17)
A recording medium in which a program for causing a computer to function as a control section is recorded, the control section indicating, to a communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among the plurality of antenna panels, and a first resource on which the antenna switching is to be performed.

REFERENCE SIGNS LIST

1 System
11 Cell

20 Core network
30 PDN
40 Beam group
50 Antenna set
51 Antenna
52 Transmission/reception switch
53 Antenna element switch
54 Transmission analogue circuit
55 Reception analogue circuit
60 Antenna panel
100 Base station
110 Antenna section
120 Wireless communication section
130 Network communication section
140 Storage section
150 Control section
151 Setting section
153 Measurement section
200 Terminal device
210 Antenna section
220 Wireless communication section
230 Storage section
240 Control section
241 Reporting section
243 Antenna control section

The invention claimed is:

1. A communication device comprising:
a plurality of antenna panels that each includes one or more antennas, one or more transmission analogue circuits for transmitting a signal by using the antenna, and one or more reception analogue circuits for receiving a signal by using the antenna; and
a control section that controls, on a basis of indication from a base station, the antenna panel in which antenna switching for switching of connection between the antenna and the transmission analogue circuit is to be performed among a plurality of the antenna panels, and a first resource on which the antenna switching in the corresponding antenna panel is to be performed.

2. The communication device according to claim 1, wherein the indication from the base station includes information that designates a second resource on which signal transmission using the antenna panel that does not currently perform the antenna switching is to be performed in a time resource for the first resource on which another antenna panel among a plurality of the antenna panels currently performs the antenna switching.

3. The communication device according to claim 2, wherein the second resource includes a frequency resource different from the first resource on which the another antenna panel currently performs the antenna switching.

4. The communication device according to claim 3, wherein the second resource includes a frequency resource that belongs to a component carrier different from that of the first resource on which the another antenna panel currently performs the antenna switching.

5. The communication device according to claim 3, wherein the second resource includes a frequency resource that belongs to a same component carrier as that of the first resource on which the another antenna panel currently performs the antenna switching, and that is different from the first resource on which the another antenna panel currently performs the antenna switching.

6. The communication device according to claim 2, wherein the indication from the base station includes transmission permission for a signal to be transmitted by using the antenna panel that does not currently perform the antenna switching among a plurality of the antenna panels.

7. The communication device according to claim 1, wherein the indication from the base station includes information for indicating the antenna switching in a plurality of the antenna panels to be performed in different time resources.

8. The communication device according to claim 1, wherein the indication from the base station includes information for indicating the antenna switching in a plurality of the antenna panels to be performed in an overlapping time resource.

9. The communication device according to claim 1, wherein the control section reports, to the base station, information indicating a configuration of each of a plurality of the antenna panels.

10. The communication device according to claim 1, wherein the control section reports, to the base station, capability information regarding the antenna switching of each of a plurality of the antenna panels.

11. The communication device according to claim 10, wherein the capability information includes information indicating whether or not the antenna panel that does not currently perform the antenna switching is capable of transmitting a signal on a frequency resource in a time resource for the first resource on which the another antenna panel currently performs the antenna switching, the frequency resource being different from the first resource on which the another antenna panel currently performs the antenna switching.

12. The communication device according to claim 11, wherein the capability information includes information indicating whether or not the antenna panel that does not currently perform the antenna switching is capable of transmitting a signal on a frequency resource in the time resource for the first resource on which the another antenna panel currently performs the antenna switching, the frequency resource belonging to a same component carrier as that of the first resource on which the another antenna panel currently performs the antenna switching, and being different from the first resource on which the another antenna panel currently performs the antenna switching.

13. A communication device comprising:
a control section that indicates, to the communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among a plurality of the antenna panels, and a first resource on which the antenna switching is to be performed.

14. A communication control method of a communication device, wherein the communication device includes a plurality of antenna panels that each includes one or more antennas, one or more transmission analogue circuits for transmitting a signal by using the antenna, and one or more reception analogue circuits for receiving a signal by using the antenna, and
the communication control method comprises:
controlling, by a processor, on a basis of indication from a base station, the antenna panel in which antenna switching for switching of connection between the antenna and the transmission analogue circuit is to be performed among a plurality of the antenna panels, and a first resource on which the antenna switching in the corresponding antenna panel is to be performed.

15. A communication control method comprising:
indicating, by a processor, to a communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among a plurality of the antenna panels, and a first resource on which the antenna switching is to be performed.

16. A non-transitory computer readable recording medium in which a program for causing a computer to function as a control section is recorded, the computer controlling a communication device including a plurality of antenna panels that each includes one or more antennas, one or more transmission analogue circuits for transmitting a signal by using the antenna, and one or more reception analogue circuits for receiving a signal by using the antenna, and the control section controlling, on a basis of indication from a base station, the antenna panel in which antenna switching for switching of connection between the antenna and the transmission analogue circuit is to be performed among a plurality of the antenna panels, and a first resource on which the antenna switching in the corresponding antenna panel is to be performed.

17. A non-transitory computer readable recording medium in which a program for causing a computer to function as a control section is recorded, the control section indicating, to a communication device including a plurality of antenna panels that each includes one or more antennas, one or more transmission analogue circuits for transmitting a signal by using the antenna, and one or more reception analogue circuits for receiving a signal by using the antenna, the antenna panel in which antenna switching for switching of connection between the antenna and the transmission analogue circuit is to be performed among a plurality of the antenna panels, and a first resource on which the antenna switching is to be performed.

* * * * *